United States Patent
Augenbergs et al.

(10) Patent No.: US 10,353,467 B2
(45) Date of Patent: Jul. 16, 2019

(54) CALIBRATION OF HAPTIC DEVICES

(71) Applicant: Apple Inc., Cupertino, CA (US)

(72) Inventors: Peteris K. Augenbergs, Cupertino, CA (US); Marc J. Piche, Cupertino, CA (US); Vinay Chawda, Glendale, CA (US); Nicole M. Wells, Cupertino, CA (US); Scott J. McEuen, Cupertino, CA (US); Curtis P. Wiederhold, Cupertino, CA (US); Jonah A. Harley, Los Gatos, CA (US); Wayne C. Westerman, Cupertino, CA (US); Jeffrey T. Bernstein, Cupertino, CA (US); Brett W. Degner, Cupertino, CA (US); Paul Briant, Menlo Park, CA (US); Thomas Wedlick, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/047,447

(22) Filed: Feb. 18, 2016

(65) Prior Publication Data

US 2016/0259480 A1    Sep. 8, 2016

Related U.S. Application Data

(60) Provisional application No. 62/129,677, filed on Mar. 6, 2015.

(51) Int. Cl.
*G06F 3/041* (2006.01)
*G06F 3/16* (2006.01)
(Continued)

(52) U.S. Cl.
CPC ............ *G06F 3/016* (2013.01); *A63F 13/285* (2014.09); *G01L 3/22* (2013.01); *G01L 5/0028* (2013.01);
(Continued)

(58) Field of Classification Search
CPC .... G06F 3/016; G06F 3/0383; G06F 3/03543; G06F 3/0414; G06F 3/0416; G06F 3/017;
(Continued)

(56) References Cited

U.S. PATENT DOCUMENTS

| 3,001,049 A | 9/1961 | Didier |
| 3,390,287 A | 6/1968 | Sonderegger |

(Continued)

FOREIGN PATENT DOCUMENTS

| AU | 2015100710 | 7/2015 |
| AU | 2016100399 | 5/2016 |

(Continued)

OTHER PUBLICATIONS

Astronomer's Toolbox, "The Electromagnetic Spectrum," http://imagine.gsfc.nasa.gov/science/toolbox/emspectrum1.html, updated Mar. 2013, 4 pages.

(Continued)

*Primary Examiner* — Dismery Mercedes
(74) *Attorney, Agent, or Firm* — Brownstein Hyatt Farber Schreck, LLP

(57) ABSTRACT

Disclosed herein are methods and systems for providing haptic output and audio output on computing devices using the same haptic device and methods for calibrating the same. To produce the haptic and audio output, the computing device receives a profile of a desired output waveform that is to be provided by the haptic device. Using the desired output waveform, an input waveform is generated. Once the input waveform that will produce the desired output waveform is generated, the input waveform may be calibrated to account for various structural components of the haptic device and may also be combined with an audio waveform. The input waveform is then provided to the haptic device.

19 Claims, 13 Drawing Sheets

(51) Int. Cl.
*G06F 3/01* (2006.01)
*G01L 5/00* (2006.01)
*G06F 1/16* (2006.01)
*G01L 3/22* (2006.01)
*A63F 13/285* (2014.01)

(52) U.S. Cl.
CPC ............... *G06F 1/16* (2013.01); *G06F 1/169* (2013.01); *G06F 3/0414* (2013.01); *A63F 2300/1037* (2013.01); *G06F 3/0416* (2013.01); *G06F 2203/015* (2013.01); *G06F 2203/04105* (2013.01)

(58) Field of Classification Search
CPC ..... G06F 2203/04105; G06F 2203/014; G06F 2203/015; G06F 1/16; G06F 1/1633; G01L 5/0028; G01L 5/0061; G01L 25/00; G01L 3/22; A63F 2300/1037; A63F 2300/6063; A63F 13/285
See application file for complete search history.

(56) References Cited

U.S. PATENT DOCUMENTS

| | | |
|---|---|---|
| 3,419,739 A | 12/1968 | Clements |
| 4,236,132 A | 11/1980 | Zissimopoulos |
| 4,412,148 A | 10/1983 | Klicker et al. |
| 4,414,984 A | 11/1983 | Zarudiansky |
| 4,490,815 A | 12/1984 | Umehara et al. |
| 4,695,813 A | 9/1987 | Nobutoki et al. |
| 4,975,616 A | 12/1990 | Park |
| 5,010,772 A | 4/1991 | Bourland |
| 5,245,734 A | 9/1993 | Issartel |
| 5,283,408 A | 2/1994 | Chen |
| 5,293,161 A | 3/1994 | MacDonald et al. |
| 5,317,221 A | 5/1994 | Kubo et al. |
| 5,365,140 A | 11/1994 | Ohya et al. |
| 5,434,549 A | 7/1995 | Hirabayashi et al. |
| 5,436,622 A | 7/1995 | Gutman et al. |
| 5,510,584 A | 4/1996 | Norris |
| 5,510,783 A | 4/1996 | Findlater et al. |
| 5,513,100 A * | 4/1996 | Parker ................. G05B 19/427 318/568.18 |
| 5,587,875 A | 12/1996 | Sellers |
| 5,590,020 A | 12/1996 | Sellers |
| 5,602,715 A | 2/1997 | Lempicki et al. |
| 5,619,005 A | 4/1997 | Shibukawa et al. |
| 5,621,610 A | 4/1997 | Moore et al. |
| 5,625,532 A | 4/1997 | Sellers |
| 5,629,578 A | 5/1997 | Winzer et al. |
| 5,635,928 A | 6/1997 | Takagi et al. |
| 5,718,418 A | 2/1998 | Gugsch |
| 5,739,759 A | 4/1998 | Nakazawa et al. |
| 5,742,242 A | 4/1998 | Sellers |
| 5,783,765 A | 7/1998 | Muramatsu |
| 5,793,605 A | 8/1998 | Sellers |
| 5,812,116 A | 9/1998 | Malhi |
| 5,813,142 A | 9/1998 | Demon |
| 5,818,149 A | 10/1998 | Safari et al. |
| 5,896,076 A | 4/1999 | Van Namen |
| 5,907,199 A | 5/1999 | Miller |
| 5,951,908 A | 9/1999 | Cui et al. |
| 5,959,613 A * | 9/1999 | Rosenberg ............... A63F 13/06 341/20 |
| 5,973,441 A * | 10/1999 | Lo ......................... H01L 41/098 310/330 |
| 5,982,304 A | 11/1999 | Selker et al. |
| 5,982,612 A | 11/1999 | Roylance |
| 5,995,026 A | 11/1999 | Sellers |
| 5,999,084 A | 12/1999 | Armstrong |
| 6,069,433 A | 5/2000 | Lazarus et al. |
| 6,078,308 A * | 6/2000 | Rosenberg ............... G05G 9/047 345/163 |
| 6,127,756 A | 10/2000 | Iwaki |
| 6,135,886 A | 10/2000 | Armstrong |
| 6,218,966 B1 | 4/2001 | Goodwin |
| 6,219,033 B1 * | 4/2001 | Rosenberg ............... A63F 13/06 345/157 |
| 6,220,550 B1 | 4/2001 | McKillip, Jr. |
| 6,222,525 B1 | 4/2001 | Armstrong |
| 6,252,336 B1 | 6/2001 | Hall |
| 6,342,880 B2 | 1/2002 | Rosenberg et al. |
| 6,351,205 B1 | 2/2002 | Armstrong |
| 6,373,465 B2 | 4/2002 | Jolly et al. |
| 6,408,187 B1 | 6/2002 | Merriam |
| 6,411,276 B1 | 6/2002 | Braun |
| 6,429,849 B1 | 8/2002 | An |
| 6,438,393 B1 | 8/2002 | Surronen |
| 6,444,928 B2 | 9/2002 | Okamoto et al. |
| 6,455,973 B1 | 9/2002 | Ineson |
| 6,465,921 B1 | 10/2002 | Horng |
| 6,552,404 B1 | 4/2003 | Hynes |
| 6,552,471 B1 | 4/2003 | Chandran et al. |
| 6,557,072 B2 | 4/2003 | Osborn |
| 6,642,857 B1 | 11/2003 | Schediwy |
| 6,693,626 B1 | 2/2004 | Rosenberg |
| 6,717,573 B1 | 4/2004 | Shahoian et al. |
| 6,809,462 B2 | 10/2004 | Pelrine et al. |
| 6,809,727 B2 | 10/2004 | Piot et al. |
| 6,864,877 B2 | 3/2005 | Braun |
| 6,906,697 B2 | 6/2005 | Rosenberg |
| 6,906,700 B1 | 6/2005 | Armstrong |
| 6,906,703 B2 | 6/2005 | Vablais et al. |
| 6,952,203 B2 | 10/2005 | Banerjee et al. |
| 6,954,657 B2 | 10/2005 | Bork et al. |
| 6,963,762 B2 | 11/2005 | Kaaresoja et al. |
| 6,995,752 B2 | 2/2006 | Lu |
| 7,005,811 B2 | 2/2006 | Wakuda et al. |
| 7,016,707 B2 | 3/2006 | Fujisawa et al. |
| 7,022,927 B2 | 4/2006 | Hsu |
| 7,023,112 B2 | 4/2006 | Miyamoto et al. |
| 7,081,701 B2 | 7/2006 | Yoon et al. |
| 7,121,147 B2 | 10/2006 | Okada |
| 7,123,948 B2 | 10/2006 | Nielsen |
| 7,130,664 B1 | 10/2006 | Williams |
| 7,136,045 B2 | 11/2006 | Rosenberg et al. |
| 7,158,122 B2 | 1/2007 | Roberts |
| 7,161,580 B2 | 1/2007 | Bailey et al. |
| 7,162,928 B2 | 1/2007 | Shank et al. |
| 7,170,498 B2 | 1/2007 | Huang |
| 7,176,906 B2 | 2/2007 | Williams et al. |
| 7,180,500 B2 | 2/2007 | Marvit et al. |
| 7,182,691 B1 | 2/2007 | Schena |
| 7,194,645 B2 | 3/2007 | Bieswanger et al. |
| 7,217,891 B2 | 5/2007 | Fischer et al. |
| 7,218,310 B2 | 5/2007 | Tierling et al. |
| 7,219,561 B2 | 5/2007 | Okada |
| 7,253,350 B2 | 8/2007 | Noro et al. |
| 7,333,604 B2 | 2/2008 | Zernovizky et al. |
| 7,334,350 B2 | 2/2008 | Ellis |
| 7,348,968 B2 | 3/2008 | Dawson |
| 7,388,741 B2 | 6/2008 | Konuma et al. |
| 7,392,066 B2 | 6/2008 | Hapamas |
| 7,423,631 B2 | 9/2008 | Shahoian et al. |
| 7,446,752 B2 | 11/2008 | Goldenberg et al. |
| 7,469,155 B2 | 12/2008 | Chu |
| 7,469,595 B2 | 12/2008 | Kessler et al. |
| 7,471,033 B2 | 12/2008 | Thiesen et al. |
| 7,495,358 B2 | 2/2009 | Kobayashi et al. |
| 7,508,382 B2 | 3/2009 | Denoue et al. |
| 7,561,142 B2 | 7/2009 | Shahoian et al. |
| 7,562,468 B2 | 7/2009 | Ellis |
| 7,569,086 B2 | 8/2009 | Chandran |
| 7,575,368 B2 | 8/2009 | Guillaume |
| 7,586,220 B2 | 9/2009 | Roberts |
| 7,619,498 B2 | 11/2009 | Miura |
| 7,639,232 B2 | 12/2009 | Grant et al. |
| 7,641,618 B2 | 1/2010 | Noda et al. |
| 7,649,305 B2 | 1/2010 | Priya et al. |
| 7,675,253 B2 | 3/2010 | Dorel |
| 7,675,414 B2 | 3/2010 | Ray |
| 7,679,611 B2 | 3/2010 | Schena |
| 7,707,742 B2 | 5/2010 | Ellis |

(56) References Cited

U.S. PATENT DOCUMENTS

| | | |
|---|---|---|
| 7,710,399 B2 | 5/2010 | Bruneau et al. |
| 7,732,951 B2 | 6/2010 | Mukaide |
| 7,737,828 B2 | 6/2010 | Yang et al. |
| 7,742,036 B2 | 6/2010 | Grant et al. |
| 7,788,032 B2 | 8/2010 | Moloney |
| 7,793,429 B2 | 9/2010 | Ellis |
| 7,793,430 B2 | 9/2010 | Ellis |
| 7,798,982 B2 | 9/2010 | Zets et al. |
| 7,868,489 B2 | 1/2011 | Amemiya et al. |
| 7,886,621 B2 | 2/2011 | Smith et al. |
| 7,886,631 B2 | 2/2011 | Smith et al. |
| 7,888,892 B2 | 2/2011 | McReynolds et al. |
| 7,893,922 B2 | 2/2011 | Klinghult et al. |
| 7,919,945 B2 | 4/2011 | Houston et al. |
| 7,929,382 B2 | 4/2011 | Yamazaki |
| 7,946,483 B2 | 5/2011 | Miller et al. |
| 7,952,261 B2 | 5/2011 | Lipton et al. |
| 7,952,566 B2 | 5/2011 | Poupyrev et al. |
| 7,956,770 B2 | 6/2011 | Klinghult et al. |
| 7,961,909 B2 | 6/2011 | Mandella et al. |
| 8,018,105 B2 | 9/2011 | Erixon et al. |
| 8,031,172 B2 | 10/2011 | Kruse et al. |
| 8,044,940 B2 | 10/2011 | Narusawa |
| 8,069,881 B1 | 12/2011 | Cunha |
| 8,072,418 B2 | 12/2011 | Crawford et al. |
| 8,077,145 B2 | 12/2011 | Rosenberg et al. |
| 8,081,156 B2 | 12/2011 | Ruettiger |
| 8,082,640 B2 | 12/2011 | Takeda |
| 8,084,968 B2 | 12/2011 | Murray et al. |
| 8,098,234 B2 | 1/2012 | Lacroix et al. |
| 8,123,660 B2 | 2/2012 | Kruse et al. |
| 8,125,453 B2 | 2/2012 | Shahoian et al. |
| 8,141,276 B2 | 3/2012 | Ellis |
| 8,156,809 B2 | 4/2012 | Tierling et al. |
| 8,174,344 B2 | 5/2012 | Yakima et al. |
| 8,174,372 B2 | 5/2012 | da Costa |
| 8,179,202 B2 | 5/2012 | Cruz-Hernandez et al. |
| 8,188,623 B2 | 5/2012 | Park et al. |
| 8,205,356 B2 | 6/2012 | Ellis |
| 8,210,942 B2 | 7/2012 | Shimabukuro et al. |
| 8,232,494 B2 | 7/2012 | Purcocks |
| 8,242,641 B2 | 8/2012 | Bae |
| 8,248,277 B2 | 8/2012 | Peterson et al. |
| 8,248,278 B2 | 8/2012 | Schlosser et al. |
| 8,253,686 B2 | 8/2012 | Kyung et al. |
| 8,255,004 B2 | 8/2012 | Huang et al. |
| 8,261,468 B2 | 9/2012 | Ellis |
| 8,264,465 B2 | 9/2012 | Grant et al. |
| 8,270,114 B2 | 9/2012 | Argumedo et al. |
| 8,270,148 B2 | 9/2012 | Griffith et al. |
| 8,288,899 B2 | 10/2012 | Park et al. |
| 8,291,614 B2 | 10/2012 | Ellis |
| 8,294,600 B2 | 10/2012 | Peterson et al. |
| 8,315,746 B2 | 11/2012 | Cox et al. |
| 8,344,834 B2 | 1/2013 | Niiyama |
| 8,378,797 B2 | 2/2013 | Pance et al. |
| 8,378,798 B2 | 2/2013 | Bells et al. |
| 8,378,965 B2 | 2/2013 | Gregorio et al. |
| 8,384,679 B2 | 2/2013 | Paleczny et al. |
| 8,390,594 B2 | 3/2013 | Modarres et al. |
| 8,395,587 B2 | 3/2013 | Cauwels et al. |
| 8,398,570 B2 | 3/2013 | Mortimer et al. |
| 8,411,058 B2 | 4/2013 | Wong et al. |
| 8,446,264 B2 | 5/2013 | Tanase |
| 8,451,255 B2 | 5/2013 | Weber et al. |
| 8,461,951 B2 | 6/2013 | Gassmann et al. |
| 8,466,889 B2 | 6/2013 | Tong et al. |
| 8,471,690 B2 | 6/2013 | Hennig et al. |
| 8,487,759 B2 | 7/2013 | Hill |
| 8,515,398 B2 | 8/2013 | Song et al. |
| 8,542,134 B2 | 9/2013 | Peterson et al. |
| 8,547,341 B2 | 10/2013 | Takashima et al. |
| 8,547,350 B2 | 10/2013 | Anglin et al. |
| 8,552,859 B2 | 10/2013 | Pakula et al. |
| 8,570,291 B2 | 10/2013 | Motomura |
| 8,575,794 B2 | 11/2013 | Lee et al. |
| 8,587,955 B2 | 11/2013 | DiFonzo et al. |
| 8,596,755 B2 | 12/2013 | Hibi |
| 8,598,893 B2 | 12/2013 | Camus |
| 8,599,047 B2 | 12/2013 | Schlosser et al. |
| 8,599,152 B1 | 12/2013 | Wurtenberger et al. |
| 8,600,354 B2 | 12/2013 | Esaki |
| 8,614,431 B2 | 12/2013 | Huppi et al. |
| 8,621,348 B2 | 12/2013 | Ramsay et al. |
| 8,629,843 B2 | 1/2014 | Steeves et al. |
| 8,633,916 B2 | 1/2014 | Bernstein et al. |
| 8,674,941 B2 | 3/2014 | Casparian et al. |
| 8,680,723 B2 | 3/2014 | Subramanian |
| 8,681,092 B2 | 3/2014 | Harada et al. |
| 8,682,396 B2 | 3/2014 | Yang et al. |
| 8,686,952 B2 | 4/2014 | Pope et al. |
| 8,710,966 B2 | 4/2014 | Hill |
| 8,717,309 B2 | 5/2014 | Almalki |
| 8,723,813 B2 | 5/2014 | Park et al. |
| 8,735,755 B2 | 5/2014 | Peterson et al. |
| 8,760,273 B2 | 6/2014 | Casparian et al. |
| 8,780,060 B2 | 7/2014 | Maschmeyer et al. |
| 8,787,006 B2 | 7/2014 | Golko et al. |
| 8,797,152 B2 | 8/2014 | Henderson et al. |
| 8,798,534 B2 | 8/2014 | Rodriguez et al. |
| 8,803,842 B2 | 8/2014 | Wakasugi et al. |
| 8,836,502 B2 | 9/2014 | Culbert et al. |
| 8,845,071 B2 | 9/2014 | Yamamoto et al. |
| 8,857,248 B2 | 10/2014 | Shih et al. |
| 8,860,562 B2 | 10/2014 | Hill |
| 8,861,776 B2 | 10/2014 | Lastrucci |
| 8,866,600 B2 | 10/2014 | Yang et al. |
| 8,890,668 B2 | 11/2014 | Pance et al. |
| 8,928,621 B2 | 1/2015 | Ciesla et al. |
| 8,947,383 B2 | 2/2015 | Ciesla et al. |
| 8,948,821 B2 | 2/2015 | Newham et al. |
| 8,952,937 B2 | 2/2015 | Shih et al. |
| 8,970,534 B2 | 3/2015 | Adachi et al. |
| 8,976,141 B2 | 3/2015 | Myers et al. |
| 9,008,730 B2 | 4/2015 | Kim et al. |
| 9,012,795 B2 | 4/2015 | Niu |
| 9,013,426 B2 | 4/2015 | Cole et al. |
| 9,019,088 B2 | 4/2015 | Zawacki et al. |
| 9,024,738 B2 | 5/2015 | Van Schyndel et al. |
| 9,035,887 B1 | 5/2015 | Prud'Hommeaux et al. |
| 9,072,576 B2 | 7/2015 | Nishiura |
| 9,092,129 B2 | 7/2015 | Abdo et al. |
| 9,098,991 B2 | 8/2015 | Park et al. |
| 9,117,347 B2 | 8/2015 | Matthews |
| 9,122,325 B2 | 9/2015 | Peshkin et al. |
| 9,131,039 B2 | 9/2015 | Behles |
| 9,134,834 B2 | 9/2015 | Reshef |
| 9,141,225 B2 | 9/2015 | Cok et al. |
| 9,158,379 B2 | 10/2015 | Cruz-Hernandez et al. |
| 9,178,509 B2 | 11/2015 | Bernstein |
| 9,189,932 B2 | 11/2015 | Kerdemelidis et al. |
| 9,201,458 B2 | 12/2015 | Hunt et al. |
| 9,202,355 B2 | 12/2015 | Hill |
| 9,235,267 B2 | 1/2016 | Pope et al. |
| 9,274,601 B2 | 3/2016 | Faubert et al. |
| 9,275,815 B2 | 3/2016 | Hoffmann |
| 9,285,923 B2 | 3/2016 | Liao et al. |
| 9,293,054 B2 | 3/2016 | Bruni et al. |
| 9,300,181 B2 | 3/2016 | Maeda et al. |
| 9,310,906 B2 | 4/2016 | Yumiki et al. |
| 9,310,950 B2 | 4/2016 | Takano et al. |
| 9,317,116 B2 | 4/2016 | Ullrich et al. |
| 9,317,118 B2 | 4/2016 | Puskarich |
| 9,317,154 B2 | 4/2016 | Perlin et al. |
| 9,318,942 B2 | 4/2016 | Sugita et al. |
| 9,325,230 B2 | 4/2016 | Yamada et al. |
| 9,357,052 B2 | 5/2016 | Ullrich |
| 9,360,944 B2 | 6/2016 | Pinault |
| 9,367,238 B2 | 6/2016 | Tanada |
| 9,380,145 B2 | 6/2016 | Tartz et al. |
| 9,390,599 B2 | 7/2016 | Weinberg |
| 9,396,434 B2 | 7/2016 | Rothkopf |
| 9,405,369 B2 | 8/2016 | Modarres et al. |
| 9,411,423 B2 | 8/2016 | Heubel |

(56) References Cited

U.S. PATENT DOCUMENTS

| | | |
|---|---|---|
| 9,417,695 B2 | 8/2016 | Griffin et al. |
| 9,449,476 B2 | 9/2016 | Lynn |
| 9,454,239 B2 | 9/2016 | Elias et al. |
| 9,477,342 B2 | 10/2016 | Daverman et al. |
| 9,501,912 B1 | 11/2016 | Hayskjold et al. |
| 9,542,028 B2 | 1/2017 | Filiz et al. |
| 9,544,694 B2 | 1/2017 | Abe et al. |
| 9,576,445 B2* | 2/2017 | Cruz-Hernandez ...... G08B 6/00 |
| 9,622,214 B2 | 4/2017 | Ryu |
| 9,659,482 B2 | 5/2017 | Yang et al. |
| 9,727,157 B2 | 8/2017 | Ham et al. |
| 9,779,592 B1 | 10/2017 | Hoen |
| 9,823,833 B2 | 11/2017 | Grant et al. |
| 9,904,393 B2 | 2/2018 | Frey et al. |
| 9,934,661 B2 | 4/2018 | Hill |
| 9,990,099 B2 | 6/2018 | Ham et al. |
| 10,067,585 B2 | 9/2018 | Kim |
| 10,139,907 B2 | 11/2018 | Billington |
| 10,139,959 B2 | 11/2018 | Butler et al. |
| 2002/0163498 A1* | 11/2002 | Chang ...................... G06F 3/016 345/156 |
| 2002/0194284 A1 | 12/2002 | Haynes |
| 2003/0210259 A1 | 11/2003 | Liu |
| 2004/0021663 A1 | 2/2004 | Suzuki et al. |
| 2004/0127198 A1 | 7/2004 | Roskind et al. |
| 2004/0169483 A1* | 9/2004 | Hardwick ............... G06F 3/011 318/560 |
| 2005/0057528 A1 | 3/2005 | Kleen |
| 2005/0107129 A1 | 5/2005 | Kaewell et al. |
| 2005/0110778 A1 | 5/2005 | Ben Ayed |
| 2005/0118922 A1 | 6/2005 | Endo |
| 2005/0134562 A1* | 6/2005 | Grant ...................... G06F 3/016 345/161 |
| 2005/0217142 A1 | 10/2005 | Ellis |
| 2005/0237306 A1 | 10/2005 | Klein et al. |
| 2005/0248549 A1 | 11/2005 | Dietz et al. |
| 2005/0258715 A1 | 11/2005 | Schlabach |
| 2006/0014569 A1 | 1/2006 | DelGiorno |
| 2006/0052907 A1* | 3/2006 | Hein ..................... B60K 37/06 701/1 |
| 2006/0154674 A1 | 7/2006 | Landschaft et al. |
| 2006/0209037 A1 | 9/2006 | Wang et al. |
| 2006/0239746 A1 | 10/2006 | Grant |
| 2006/0252463 A1 | 11/2006 | Liao |
| 2007/0043725 A1* | 2/2007 | Hotelling ............... G06F 3/016 |
| 2007/0099574 A1 | 5/2007 | Wang |
| 2007/0152974 A1 | 7/2007 | Kim et al. |
| 2007/0168430 A1 | 7/2007 | Brun et al. |
| 2007/0178942 A1 | 8/2007 | Sadler et al. |
| 2007/0188450 A1 | 8/2007 | Hernandez et al. |
| 2008/0084384 A1 | 4/2008 | Gregorio et al. |
| 2008/0158149 A1 | 7/2008 | Levin |
| 2008/0165148 A1 | 7/2008 | Williamson |
| 2008/0181501 A1 | 7/2008 | Faraboschi |
| 2008/0181706 A1 | 7/2008 | Jackson |
| 2008/0192014 A1 | 8/2008 | Kent et al. |
| 2008/0204428 A1 | 8/2008 | Pierce et al. |
| 2008/0255794 A1 | 10/2008 | Levine |
| 2009/0002328 A1 | 1/2009 | Ullrich et al. |
| 2009/0115734 A1 | 5/2009 | Fredriksson et al. |
| 2009/0120105 A1 | 5/2009 | Ramsay et al. |
| 2009/0128503 A1 | 5/2009 | Grant et al. |
| 2009/0135142 A1 | 5/2009 | Fu et al. |
| 2009/0167702 A1 | 7/2009 | Nurmi |
| 2009/0167704 A1 | 7/2009 | Terlizzi et al. |
| 2009/0218148 A1 | 9/2009 | Hugeback et al. |
| 2009/0225046 A1 | 9/2009 | Kim et al. |
| 2009/0236210 A1 | 9/2009 | Clark et al. |
| 2009/0243997 A1* | 10/2009 | Tierling ................. G01H 13/00 345/156 |
| 2009/0267892 A1 | 10/2009 | Faubert |
| 2009/0291670 A1 | 11/2009 | Sennett et al. |
| 2009/0313542 A1 | 12/2009 | Cruz-Hernandez et al. |
| 2010/0020036 A1 | 1/2010 | Hui et al. |
| 2010/0053087 A1 | 3/2010 | Dai et al. |
| 2010/0079264 A1 | 4/2010 | Hoellwarth |
| 2010/0089735 A1 | 4/2010 | Takeda et al. |
| 2010/0141408 A1* | 6/2010 | Doy ........................ G06F 3/016 340/407.2 |
| 2010/0141606 A1 | 6/2010 | Bae et al. |
| 2010/0148944 A1 | 6/2010 | Kim et al. |
| 2010/0152620 A1 | 6/2010 | Ramsay et al. |
| 2010/0164894 A1 | 7/2010 | Kim et al. |
| 2010/0188422 A1 | 7/2010 | Shingai et al. |
| 2010/0194547 A1 | 8/2010 | Terrell et al. |
| 2010/0231508 A1 | 9/2010 | Cruz-Hernandez et al. |
| 2010/0231550 A1 | 9/2010 | Cruz-Hernandez et al. |
| 2010/0265197 A1 | 10/2010 | Purdy |
| 2010/0309141 A1 | 12/2010 | Cruz-Hernandez et al. |
| 2010/0328229 A1 | 12/2010 | Weber et al. |
| 2011/0007023 A1 | 1/2011 | Abrahamsson et al. |
| 2011/0053577 A1 | 3/2011 | Lee et al. |
| 2011/0075835 A1* | 3/2011 | Hill .................... H04M 1/72563 379/418 |
| 2011/0107958 A1 | 5/2011 | Pance et al. |
| 2011/0121765 A1 | 5/2011 | Anderson et al. |
| 2011/0128239 A1 | 6/2011 | Polyakov et al. |
| 2011/0148608 A1 | 6/2011 | Grant et al. |
| 2011/0157052 A1 | 6/2011 | Lee et al. |
| 2011/0163985 A1 | 7/2011 | Bae et al. |
| 2011/0193824 A1 | 8/2011 | Modarres et al. |
| 2011/0248817 A1* | 10/2011 | Houston ................. A63F 13/06 340/4.2 |
| 2011/0248948 A1 | 10/2011 | Griffin et al. |
| 2011/0260988 A1 | 10/2011 | Colgate et al. |
| 2011/0263200 A1 | 10/2011 | Thornton et al. |
| 2011/0291950 A1 | 12/2011 | Tong |
| 2011/0304559 A1 | 12/2011 | Pasquero |
| 2012/0068957 A1 | 3/2012 | Puskarich et al. |
| 2012/0075198 A1 | 3/2012 | Sulem et al. |
| 2012/0083341 A1* | 4/2012 | George ................... G06F 3/041 463/37 |
| 2012/0092263 A1 | 4/2012 | Peterson et al. |
| 2012/0126959 A1 | 5/2012 | Zarrabi et al. |
| 2012/0127088 A1 | 5/2012 | Pance et al. |
| 2012/0133494 A1 | 5/2012 | Cruz-Hernandez et al. |
| 2012/0139844 A1 | 6/2012 | Ramstein et al. |
| 2012/0185099 A1* | 7/2012 | Bosscher ............... B25J 9/1689 700/264 |
| 2012/0188180 A1* | 7/2012 | Yang ...................... G06F 3/016 345/173 |
| 2012/0206248 A1 | 8/2012 | Biggs |
| 2012/0256848 A1 | 10/2012 | Madabusi Srinivasan |
| 2012/0268412 A1 | 10/2012 | Cruz-Hernandez et al. |
| 2012/0274578 A1 | 11/2012 | Snow et al. |
| 2012/0280927 A1 | 11/2012 | Ludwig |
| 2012/0306631 A1* | 12/2012 | Hughes ................. G09B 21/009 340/407.1 |
| 2012/0319987 A1* | 12/2012 | Woo ....................... G06F 3/016 345/174 |
| 2012/0327006 A1 | 12/2012 | Israr et al. |
| 2013/0027345 A1 | 1/2013 | Binzel |
| 2013/0033967 A1 | 2/2013 | Chuang et al. |
| 2013/0058816 A1 | 3/2013 | Kim |
| 2013/0063356 A1 | 3/2013 | Martisauskas |
| 2013/0106699 A1 | 5/2013 | Babatunde |
| 2013/0141365 A1 | 6/2013 | Lynn et al. |
| 2013/0142362 A1* | 6/2013 | Lynn ...................... G06F 3/041 381/109 |
| 2013/0191741 A1 | 7/2013 | Dickinson et al. |
| 2013/0200732 A1 | 8/2013 | Jun et al. |
| 2013/0207793 A1 | 8/2013 | Weaber et al. |
| 2013/0217491 A1 | 8/2013 | Hilbert et al. |
| 2013/0222280 A1 | 8/2013 | Sheynblat et al. |
| 2013/0228023 A1 | 9/2013 | Drasnin et al. |
| 2013/0261811 A1 | 10/2013 | Yagi et al. |
| 2013/0300590 A1 | 11/2013 | Dietz et al. |
| 2014/0035397 A1 | 2/2014 | Endo et al. |
| 2014/0082490 A1 | 3/2014 | Jung et al. |
| 2014/0085065 A1* | 3/2014 | Biggs ..................... G06F 3/016 340/407.2 |

(56) References Cited

U.S. PATENT DOCUMENTS

| | | | | |
|---|---|---|---|---|
| 2014/0118126 | A1* | 5/2014 | Garg | G06F 3/016 340/407.1 |
| 2014/0143785 | A1 | 5/2014 | Mistry et al. | |
| 2014/0168153 | A1 | 6/2014 | Deichmann et al. | |
| 2014/0197936 | A1 | 7/2014 | Biggs et al. | |
| 2014/0232534 | A1 | 8/2014 | Birnbaum et al. | |
| 2014/0247227 | A1 | 9/2014 | Jiang et al. | |
| 2014/0267076 | A1 | 9/2014 | Birnbaum et al. | |
| 2014/0267952 | A1 | 9/2014 | Sirois | |
| 2014/0315642 | A1* | 10/2014 | Grant | A63F 13/06 463/38 |
| 2014/0347176 | A1* | 11/2014 | Modarres | G06F 3/016 340/407.1 |
| 2015/0005039 | A1 | 1/2015 | Liu et al. | |
| 2015/0040005 | A1 | 2/2015 | Faaborg | |
| 2015/0090572 | A1 | 4/2015 | Lee et al. | |
| 2015/0098309 | A1 | 4/2015 | Adams et al. | |
| 2015/0169059 | A1 | 6/2015 | Behles et al. | |
| 2015/0192414 | A1 | 7/2015 | Das et al. | |
| 2015/0194165 | A1 | 7/2015 | Faaborg et al. | |
| 2015/0220199 | A1 | 8/2015 | Wang et al. | |
| 2015/0227204 | A1 | 8/2015 | Gipson et al. | |
| 2015/0234493 | A1* | 8/2015 | Parivar | G06F 3/016 345/174 |
| 2015/0296480 | A1 | 10/2015 | Kinsey et al. | |
| 2015/0324049 | A1 | 11/2015 | Kies et al. | |
| 2015/0349619 | A1 | 12/2015 | Degner et al. | |
| 2016/0049265 | A1 | 2/2016 | Bernstein | |
| 2016/0063826 | A1 | 3/2016 | Morrell et al. | |
| 2016/0071384 | A1 | 3/2016 | Hill | |
| 2016/0103544 | A1 | 4/2016 | Filiz et al. | |
| 2016/0162025 | A1* | 6/2016 | Shah | G06F 3/016 345/156 |
| 2016/0163165 | A1 | 6/2016 | Morrell et al. | |
| 2016/0172953 | A1 | 6/2016 | Hamel et al. | |
| 2016/0195929 | A1 | 7/2016 | Martinez et al. | |
| 2016/0196935 | A1 | 7/2016 | Bernstein | |
| 2016/0206921 | A1 | 7/2016 | Szabados et al. | |
| 2016/0211736 | A1 | 7/2016 | Moussette et al. | |
| 2016/0216764 | A1 | 7/2016 | Morrell et al. | |
| 2016/0216766 | A1 | 7/2016 | Puskarich | |
| 2016/0231815 | A1 | 8/2016 | Moussette et al. | |
| 2016/0233012 | A1 | 8/2016 | Lubinski et al. | |
| 2016/0241119 | A1 | 8/2016 | Keeler | |
| 2016/0306423 | A1 | 10/2016 | Uttermann et al. | |
| 2016/0371942 | A1 | 12/2016 | Smith, IV et al. | |
| 2017/0038905 | A1 | 2/2017 | Bijamov et al. | |
| 2017/0070131 | A1 | 3/2017 | Degner et al. | |
| 2017/0084138 | A1 | 3/2017 | Hajati et al. | |
| 2017/0085163 | A1 | 3/2017 | Hajati et al. | |
| 2017/0090667 | A1 | 3/2017 | Abdollahian et al. | |
| 2017/0192507 | A1 | 7/2017 | Lee et al. | |
| 2017/0192508 | A1 | 7/2017 | Lim et al. | |
| 2017/0242541 | A1 | 8/2017 | Iuchi et al. | |
| 2017/0255295 | A1 | 9/2017 | Tanemura et al. | |
| 2017/0257844 | A1 | 9/2017 | Miller et al. | |
| 2017/0285747 | A1 | 10/2017 | Chen | |
| 2017/0311282 | A1 | 10/2017 | Miller et al. | |
| 2017/0357325 | A1 | 12/2017 | Yang et al. | |
| 2017/0364158 | A1 | 12/2017 | Wen et al. | |
| 2018/0052550 | A1 | 2/2018 | Zhang et al. | |
| 2018/0060941 | A1 | 3/2018 | Yang et al. | |
| 2018/0075715 | A1 | 3/2018 | Morrell et al. | |
| 2018/0081441 | A1 | 3/2018 | Pedder et al. | |
| 2018/0174409 | A1 | 6/2018 | Hill | |
| 2018/0203513 | A1 | 7/2018 | Rihn | |
| 2018/0302881 | A1 | 10/2018 | Miller et al. | |
| 2019/0159170 | A1 | 5/2019 | Miller et al. | |

FOREIGN PATENT DOCUMENTS

| | | |
|---|---|---|
| CA | 2355434 | 2/2002 |
| CN | 1324030 | 11/2001 |
| CN | 1692371 | 11/2005 |
| CN | 1817321 | 8/2006 |
| CN | 101120290 | 2/2008 |
| CN | 101409164 | 4/2009 |
| CN | 101763192 | 6/2010 |
| CN | 101903848 | 12/2010 |
| CN | 101938207 | 1/2011 |
| CN | 102025257 | 4/2011 |
| CN | 201829004 | 5/2011 |
| CN | 102163076 | 8/2011 |
| CN | 102246122 | 11/2011 |
| CN | 102315747 | 1/2012 |
| CN | 102591512 | 7/2012 |
| CN | 102667681 | 9/2012 |
| CN | 102713805 | 10/2012 |
| CN | 102768593 | 11/2012 |
| CN | 102844972 | 12/2012 |
| CN | 102915111 | 2/2013 |
| CN | 103019569 | 4/2013 |
| CN | 103154867 | 6/2013 |
| CN | 103181090 | 6/2013 |
| CN | 103218104 | 7/2013 |
| CN | 103278173 | 9/2013 |
| CN | 103416043 | 11/2013 |
| CN | 103440076 | 12/2013 |
| CN | 103567135 | 2/2014 |
| CN | 103970339 | 8/2014 |
| CN | 104220963 | 12/2014 |
| CN | 104956244 | 9/2015 |
| CN | 105556268 | 5/2016 |
| DE | 19517630 | 11/1996 |
| DE | 10330024 | 1/2005 |
| DE | 102009038103 | 2/2011 |
| DE | 102011115762 | 4/2013 |
| EP | 0483955 | 5/1992 |
| EP | 1047258 | 10/2000 |
| EP | 1686776 | 8/2006 |
| EP | 2060967 | 5/2009 |
| EP | 2073099 | 6/2009 |
| EP | 2194444 | 6/2010 |
| EP | 2264562 A2 | 12/2010 |
| EP | 2315186 | 4/2011 |
| EP | 2374430 | 10/2011 |
| EP | 2395414 | 12/2011 |
| EP | 2461228 | 6/2012 |
| EP | 2631746 | 8/2013 |
| EP | 2434555 | 10/2013 |
| JP | H05301342 A2 | 11/1993 |
| JP | 2002199689 | 7/2002 |
| JP | 2002102799 | 9/2002 |
| JP | 200362525 | 3/2003 |
| JP | 2003527046 | 9/2003 |
| JP | 200494389 | 3/2004 |
| JP | 2004236202 | 8/2004 |
| JP | 2006150865 | 6/2006 |
| JP | 2007519099 | 7/2007 |
| JP | 2010272903 | 12/2010 |
| JP | 2012135755 | 7/2012 |
| JP | 2014002729 | 1/2014 |
| JP | 2014509028 | 4/2014 |
| JP | 2014235133 | 12/2014 |
| JP | 2016095552 | 5/2016 |
| KR | 20050033909 | 4/2005 |
| KR | 1020100046602 | 5/2010 |
| KR | 1020110101516 | 9/2011 |
| KR | 20130024420 | 3/2013 |
| TW | 200518000 | 11/2007 |
| TW | 200951944 | 12/2009 |
| TW | 201145336 | 12/2011 |
| TW | 201218039 | 5/2012 |
| TW | 201425180 | 7/2014 |
| WO | WO 97/16932 | 5/1997 |
| WO | WO 00/051190 | 8/2000 |
| WO | WO 01/059588 | 8/2001 |
| WO | WO 01/089003 | 11/2001 |
| WO | WO 02/073587 | 9/2002 |
| WO | WO 03/038800 | 5/2003 |
| WO | WO 03/100550 | 12/2003 |
| WO | WO 06/057770 | 6/2006 |
| WO | WO 07/114631 | 10/2007 |

(56) References Cited

FOREIGN PATENT DOCUMENTS

| WO | WO 08/075082 | | 6/2008 | |
|----|----|----|----|----|
| WO | WO 09/038862 | | 3/2009 | |
| WO | WO 09/068986 | | 6/2009 | |
| WO | WO 09/097866 | | 8/2009 | |
| WO | WO 09/122331 | | 10/2009 | |
| WO | WO 09/150287 | | 12/2009 | |
| WO | WO 10/085575 | | 7/2010 | |
| WO | WO 10/087925 | | 8/2010 | |
| WO | WO 11/007263 | | 1/2011 | |
| WO | WO 12/052635 | | 4/2012 | |
| WO | WO 12/129247 | | 9/2012 | |
| WO | WO 13/069148 | | 5/2013 | |
| WO | WO 13/150667 | | 10/2013 | |
| WO | WO 13/173838 | | 11/2013 | |
| WO | WO 2013169302 | A1 * | 11/2013 | ............. G06F 3/016 |
| WO | WO 13/186846 | | 12/2013 | |
| WO | WO 13/186847 | | 12/2013 | |
| WO | WO 14/018086 | | 1/2014 | |
| WO | WO 14/098077 | | 6/2014 | |
| WO | WO 13/169299 | | 11/2014 | |
| WO | WO 15/023670 | | 2/2015 | |

OTHER PUBLICATIONS

Hasser et al., "Preliminary Evaluation of a Shape-Memory Alloy Tactile Feedback Display," Advances in Robotics, Mechantronics, and Haptic Interfaces, ASME, DSC-vol. 49, pp. 73-80, 1993.

Hill et al., "Real-time Estimation of Human Impedance for Haptic Interfaces," Stanford Telerobotics Laboratory, Department of Mechanical Engineering, Standford University, 6 pages, at least as early as Sep. 30, 2009.

Kim et al., "Tactile Rendering of 3D Features on Touch Surfaces," UIST '13, Oct. 8-11, 2013, St. Andrews, United Kingdom, 8 pages.

Lee et al, "Haptic Pen: Tactile Feedback Stylus for Touch Screens," Mitsubishi Electric Research Laboratories, http://wwwlmerl.com, 6 pages, Oct. 2004.

U.S. Appl. No. 12/750,054, filed Mar. 30, 2010, Hill.
U.S. Appl. No. 12/887,455, filed Sep. 21, 2010, Puskarich et al.
U.S. Appl. No. 12/950,940, filed Nov. 19, 2010, Pance et al.
U.S. Appl. No. 13/630,867, filed Sep. 28, 2012, Bernstein.
U.S. Appl. No. 13/943,639, filed Jul. 16, 2013, Hill.
U.S. Appl. No. 14/059,693, filed Oct. 22, 2013, Puskarich.
U.S. Appl. No. 14/165,475, filed Jan. 27, 2014, Hayskjold et al.
U.S. Appl. No. 14/493,190, filed Sep. 22, 2014, Hoen.
U.S. Appl. No. 14/512,927, filed Oct. 13, 2014, Hill.
U.S. Appl. No. 14/728,505, filed Jun. 2, 2015, Degner et al.
U.S. Appl. No. 14/841,582, filed Aug. 31, 2015, Morrell et al.
U.S. Appl. No. 14/910,108, filed Feb. 4, 2016, Martinez et al.
U.S. Appl. No. 14/928,465, filed Oct. 30, 2015, Bernstein.
U.S. Appl. No. 14/942,521, filed Nov. 16, 2015, Hill.
U.S. Appl. No. 15/025,243, filed Mar. 25, 2016, Keeler.
U.S. Appl. No. 15/025,250, filed Mar. 25, 2016, Moussette et al.
U.S. Appl. No. 15/025,254, filed Mar. 25, 2016, Lubinski et al.
U.S. Appl. No. 15/025,277, filed Mar. 27, 2016, Morrell et al.
U.S. Appl. No. 15/025,425, filed Mar. 28, 2016, Moussette et al.
U.S. Appl. No. 15/045,761, filed Feb. 17, 2016, Morrell et al.
U.S. Appl. No. 15/046,194, filed Feb. 17, 2016, Degner et al.
U.S. Appl. No. 15/068,038, filed Mar. 11, 2016, Bernstein.
U.S. Appl. No. 15/091,501, filed Apr. 5, 2016, Puskarich.
U.S. Appl. No. 15/098,669, filed Apr. 14, 2016, Uttermann et al.
U.S. Appl. No. 15/102,826, filed Jun. 8, 2016, Smith et al.
Nakamura, "A Torso Haptic Display Based on Shape Memory Alloy Actuators," Massachusetts Institute of Technology, 2003, pp. 1-123.
U.S. Appl. No. 15/621,966, filed Jun. 13, 2017, Pedder et al.
U.S. Appl. No. 15/621,930, filed Jun. 13, 2017, Wen et al.
U.S. Appl. No. 15/622,017, filed Jun. 13, 2017, Yang et al.
Actuator definition downloaded from http://www.thefreedictionary.com/actuator on May 3, 2018, 2 pages.
U.S. Appl. No. 15/800,630, filed Nov. 1, 2017, Morrell et al.
U.S. Appl. No. 15/881,476, filed Jan. 26, 2018, Moussette et al.

* cited by examiner

CALIBRATION OF HAPTIC DEVICES

CROSS-REFERENCE TO RELATED APPLICATIONS

This application is a nonprovisional patent application of and claims the benefit of U.S. Provisional Patent Application No. 62/129,677, filed Mar. 6, 2015 and titled "Calibration of Haptic Devices," the disclosure of which is hereby incorporated herein by reference in its entirety.

FIELD

The present disclosure relates generally to haptic output in electronic devices. More specifically, the present disclosure is directed to providing audio and haptic output from a haptic device and a method and system for calibrating the haptic device.

BACKGROUND

Electronic devices may employ haptic output to provide a user with a tactile sensation in various circumstances. For example, haptic output may be provided in response to a particular input by the user, a system state, or an application instruction. As a specific example, some electronic devices, such as a laptop computer, include a trackpad or button that may move or vibrate to provide haptic output to a user. However, the feel of the haptic output may vary from device to device and may also vary over time as the device is continually used.

It is with respect to these and other general considerations that embodiments have been made. Although relatively specific problems have been discussed, it should be understood that the embodiments should not be limited to solving the specific problems identified in this background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Disclosed herein are methods and systems for calibrating a haptic device. According to this exemplary method, one or more characteristics of an input waveform is obtained or otherwise received. A current profile associated with the input waveform is then determined. As part of determining the current profile, a scaling factor associated with the input waveform is also determined. The scaling factor may be combined with the input waveform to cause an output waveform to be substantially similar to the input waveform.

Also disclosed is a haptic output device capable of providing both audio output and vibratory output. The haptic device includes a feedback surface, an actuator, one or more biasing supports and a controller operatively coupled to the actuator. The controller is configured to receive parameters of a desired output waveform that is to be provided by the haptic output device. Using these parameters, an input waveform is generated that is based on the desired output waveform. The input waveform is then provided to the actuator to generate an actual output waveform. The actual output waveform should have parameters that match or otherwise correspond to the parameters of the desired output waveform.

A method for providing tactile output and audio output on haptic device for an electronic device is also disclosed. According to this method, the electronic device receives a profile of a desired output waveform that is to be provided by the haptic device. An input waveform based on the desired output waveform is then generated. Once the input waveform has been generated, an audio waveform is superimposed on or otherwise added to the input waveform. The input waveform having the audio waveform is then provided to the haptic device which generates the tactile output and the audio output.

BRIEF DESCRIPTION OF THE DRAWINGS

This summary is provided to introduce Embodiments of the present disclosure will be readily understood by the following detailed description in conjunction with the accompanying drawings. The elements of the drawings are not necessarily to scale relative to each other. Identical reference numerals have been used, where possible, to designate identical features that are common to the figures.

DETAILED DESCRIPTION

Figure 1A:
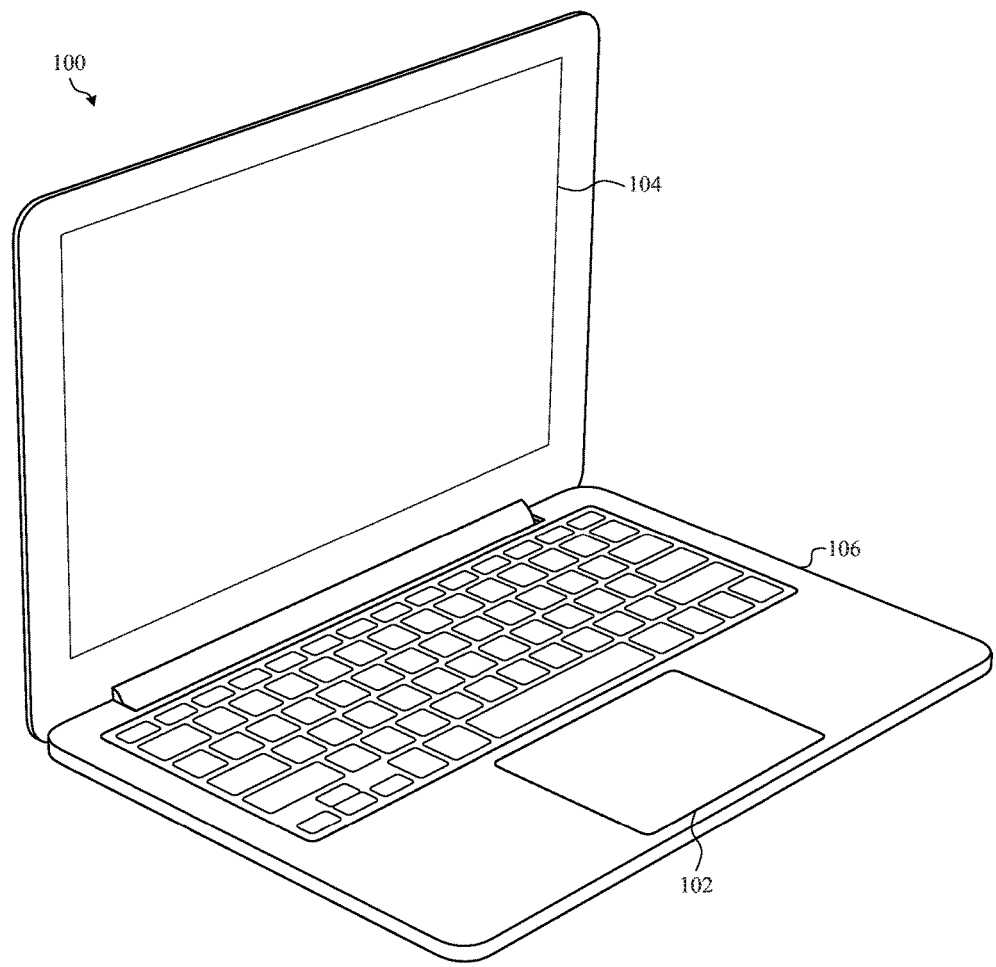
FIG. 1A-FIG. 1C illustrate exemplary electronic devices incorporating a haptic device according to one or more embodiments of the present disclosure.

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. The following detailed description is, therefore, not to be taken in a limiting sense.

Trackpads, touch screens and other such haptic devices of the various electronic devices disclosed herein may be programmable to provide various types of outputs to a user of the electronic device. The outputs may be provided by a single haptic device or multiple haptic devices that provide audio output, tactile or haptic output and a combination of haptic and audio output. The audio and haptic output, and more specifically the types, combinations, durations and so on of the output, may be based on user preferences, user interface elements, input dynamics from a user (e.g., how hard the user presses on the haptic device, the length of the press etc.) and habits of the user. For example, if a user takes a first action in a first application, the haptic device may provide both audio output and tactile output. In response to a second action taken by a user, the haptic device may provide a second audio output and a second tactile output. In some embodiments, the electronic device may adaptively learn the habits of the user and alter the haptic output accordingly.

As will be explained below, in order for the haptic device to provide the haptic output and the audio output, a voltage or current, represented a current waveform, is combined with an audio waveform. The input voltage waveform may be in the form of a half-sine wave (or a Gaussian wave), a sine wave, a half elliptical wave, a saw-tooth wave, a pulse, a ramp down or ramp up wave, a square wave, and various combinations of such waveforms. Further, each current waveform may be associated with a particular amplitude, displacement, momentum and/or velocity.

More specifically, once the desired haptic output is determined, including the feel and the duration of the haptic output, the type of audio output that is to be provided may also be determined. As will be appreciated, each type of audio output that is provided may be associated with a particular input audio waveform. As such, each of the various types of audio waveforms may be combined with the various types of input waveforms described above. It should be appreciated that although a combination of audio output and haptic output is disclosed, the methods, systems and devices described herein may be used to provide haptic output or audio output.

Once the audio output (represented as an audio input waveform) and the haptic output (represented as a haptic input waveform) have been determined, the waveforms are combined into an input waveform and provided to a haptic actuator. As the haptic actuator receives the input waveform, mechanical movement output by the actuator may vary, such that one type of waveform may have a different acoustic and haptic output compared to another waveform. In other words, the displacement direction or directions and/or speed of a feedback surface of the haptic device may be varied by changing the shape, frequency, amplitude, phase, and/or duration of the input waveform or signal. In addition, the tone, sound, and duration of the acoustic or audio output may be altered by changing the shape, frequency, amplitude and so on of the audio waveform. Thus, by changing the input waveform the haptic and acoustic output experienced by a user may be changed.

In addition to the above, it may be useful that all audio output and/or haptic output be the same, similar or substantially similar across various devices as the consistency of user experiences enhances a user's ability to discern and understand the haptic output. For example, the haptic output and audio output provided by a first haptic device on a first electronic device should be similar to the haptic output and audio output provided on a second electronic device in order to enhance the user experience. Further, these different types of output should not vary as the device continues to be used. That is, over the lifespan of the electronic device, the haptic device should generally provide the same or similar haptic output and audio output. Accordingly, embodiments of the present disclosure are directed to performing a calibration technique on a haptic device such, as for example, a haptic trackpad.

Additionally, in many implementations, a haptic device itself can affect the quality of waveforms output therefrom. For example, an input waveform can be distorted, attenuated, or otherwise affected as a result of the materials selected for a particular haptic device. In other examples, the structure of a haptic device can affect the output waveform.

Accordingly, many embodiments described herein model the haptic device as a linear time-invariant ("LTI") system having a single input and a single output. These embodiments can include a filter (e.g., inverse of the transfer function) designed to account for the effects of the LTI system. As a result of the filter, the waveform output from the haptic device may more accurately reproduce the waveform input to the filter, effectively mitigating any distortions, attenuations, or other effects introduced by the haptic device itself.

In these embodiments, the filter can correspond to the inverse of a transfer function that models the LTI effects of the haptic device. In some embodiments, the transfer function (and/or its inverse) can be analytically derived. In other embodiments, the transfer function can be experimentally derived. However, as may be appreciated, analytical derivation of a transfer function of an LTI system may be computationally impractical to perform on demand for certain haptic devices. Similarly, it may be prohibitively time consuming to experimentally derive the same. Accordingly, many embodiments described herein relate to methods for efficiently determining a transfer function (and/or inverse thereof) of a particular haptic device given a particular input waveform. Thereafter, the transfer function (or parameters that define the transfer function) can be saved as calibration parameters and can be used as an effective approximation of the transfer function for other waveforms. For example, a transfer function derived to filter a Gaussian waveform of variable peak amplitude through a particular haptic device can be saved, and can thereafter be used as a filter for arbitrarily-shaped signals passed through that same haptic device.

For example, many embodiments described herein can include haptic devices generating output waveforms that are affected by the stiffness of a gel used to soften the feel of the haptic trackpad to a user. Such a system can be modeled by a second-order differential equation dependent upon the mass of moving portions of the haptic device and the stiffness of the gel. To obtain an approximation of the stiffness of the gel, a series of Gaussian pulses with known peak amplitude can be applied to the haptic device, and the input waveforms can be compared to the output waveforms. Based upon the difference in magnitude between the input Gaussian pulse and the measured output waveform, an approximation of the stiffness of the gel can be obtained by solving the second-order differential equation. Thereafter, the peak amplitude of the input Gaussian pulse can be changed, and a new stiffness can be determined. Repeating in this manner, a functional relationship between peak amplitude of a Gaussian pulse and the gel stiffness can be determined. Thereafter, this function can be used (with or without amplitude scaling) to define a filter that effectively mitigates any distortions, attenuations, or other effects introduced by the haptic device when the input waveform is a Gaussian pulse. This function (and/or coefficients that define this functional relationship) can be saved as calibration parameters to be used to filter arbitrary input waveforms.

Figure 1B:
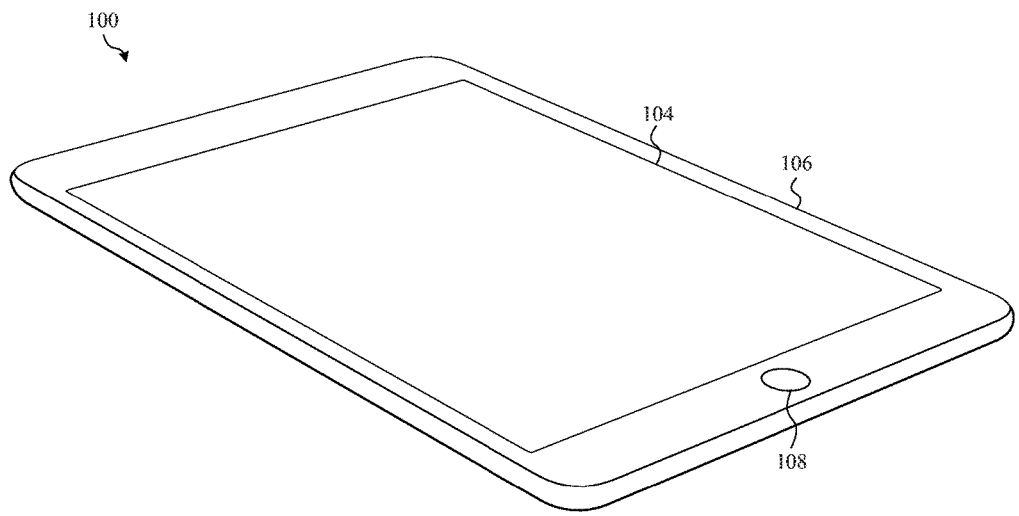
Figure 1C:
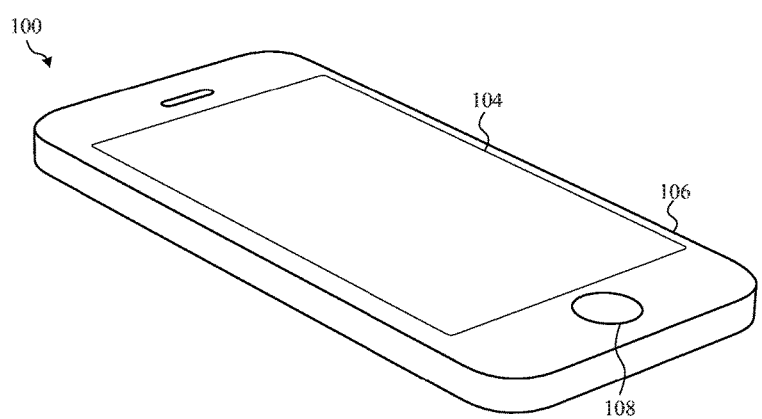

The methods and devices described herein may be used with substantially any type of apparatus or device where haptic output and/or audio output may be desired. For example, FIG. 1A-FIG. 1C illustrate exemplary electronic devices 100 that may be used with the various embodiments described herein. As shown in FIG. 1A, the electronic device 100 may be a laptop computer. Alternatively, as depicted in FIG. 1B and FIG. 1C, the electronic device 100 can be a tablet computer or a mobile telephone. It should be noted that the electronic devices 100 illustrated and described are illustrative only and substantially any other type of electronic device, such as but not limited to, a computer, a digital music player, a wearable electronic device, a digital camera, a personal digital assistant, and so on may include one or more haptic devices.

With reference to FIG. 1A-FIG. 1C, the electronic device 100 may include a haptic device 102 such as, for example, a trackpad or other input device, and a display 104. In some embodiments, the haptic device 102 and the display 104 may be part of the same unit. For example, a tablet computer such as shown in FIG. 1B, may have a display 104 that also acts as a haptic device. In some embodiments, the display 104 may be touch sensitive and enable a user to provide one or more commands or other types of input to the electronic device 100.

It should also be noted that FIG. 1A-FIG. 1C are exemplary only. In other examples, the electronic device 100 may include fewer or more components than those shown above or described below. Additionally, the illustrated electronic devices 100 are exemplary devices that can include a haptic device 102. In other embodiments, a haptic device 102 such as described herein may be incorporated into substantially any type of device that provides haptic output and/or audio output to a user. Additionally or alternatively, a haptic device 102 can be included in any type of component within, or connected to an electronic device 100. For example, one or more haptic devices 102 can be included in an enclosure 106 or button 108 of an electronic device 100, or in a component operatively connected to an electronic device 100 including input devices such as a mouse or keyboard, output devices and other accessories.

Figure 2:
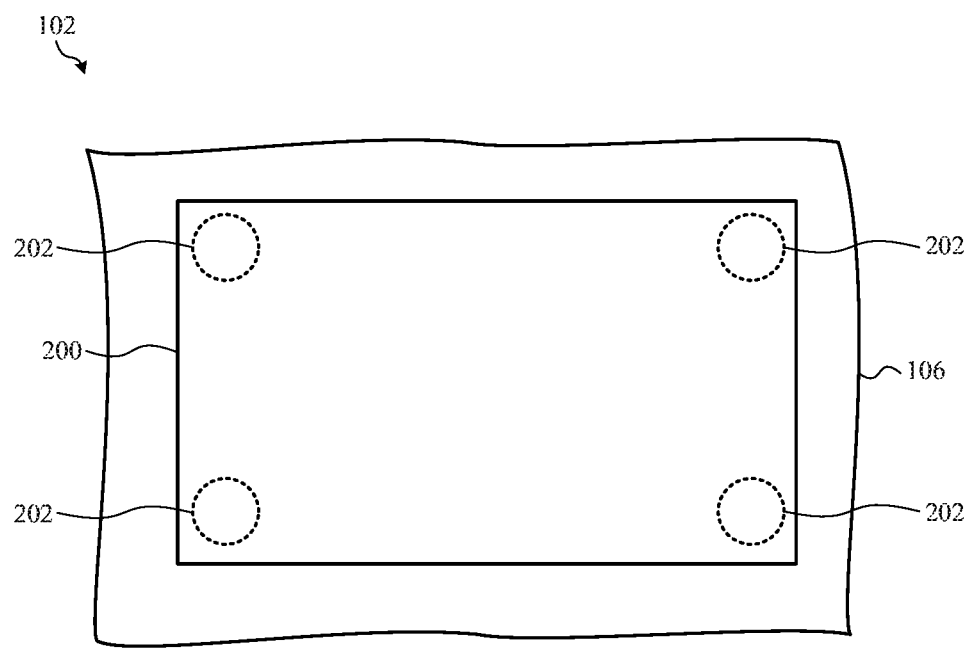
FIG. 2 is an enlarged top plan view of a sample haptic device that may be incorporated into or provided with one or more of the devices shown in FIG. 1A-FIG. 1C according to one or more embodiments of the present disclosure.

Referring now to FIG. 2, the figure illustrates an enlarged plan view of an exemplary haptic device 102 according to one or more embodiments of the present disclosure. In some embodiments, the haptic device 102 provides both audio output and tactile output to a user by moving, vibrating, or otherwise alternating a feedback surface 200. In some embodiments, the feedback surface may be made of glass, plastic, sapphire or other such material. As shown in FIG. 2, the feedback surface 200 is substantially co-planar with an exterior surface of the enclosure 106 of the electronic device 100. However, it is contemplated that the feedback surface may be raised or recessed with respect to the exterior surface. Although shown in a rectangular shape, the feedback surface 200 may have any shape and/or dimensions.

The haptic device 102 may include one or more force sensors 202. Although not shown, the haptic device 102 can include other types of sensors, such as position sensors that may be disposed below the feedback surface 200, acceleration sensors that are configured to detect an acceleration of a user input or other movement of the electronic device 100 and so on. The force sensors can be any suitable type of sensor capable of detecting an exerted force. For example, in some embodiments the force sensor may be a strain gauge, capacitive, resistive, optic, piezoelectric or other suitable force sensor.

Figure 3:
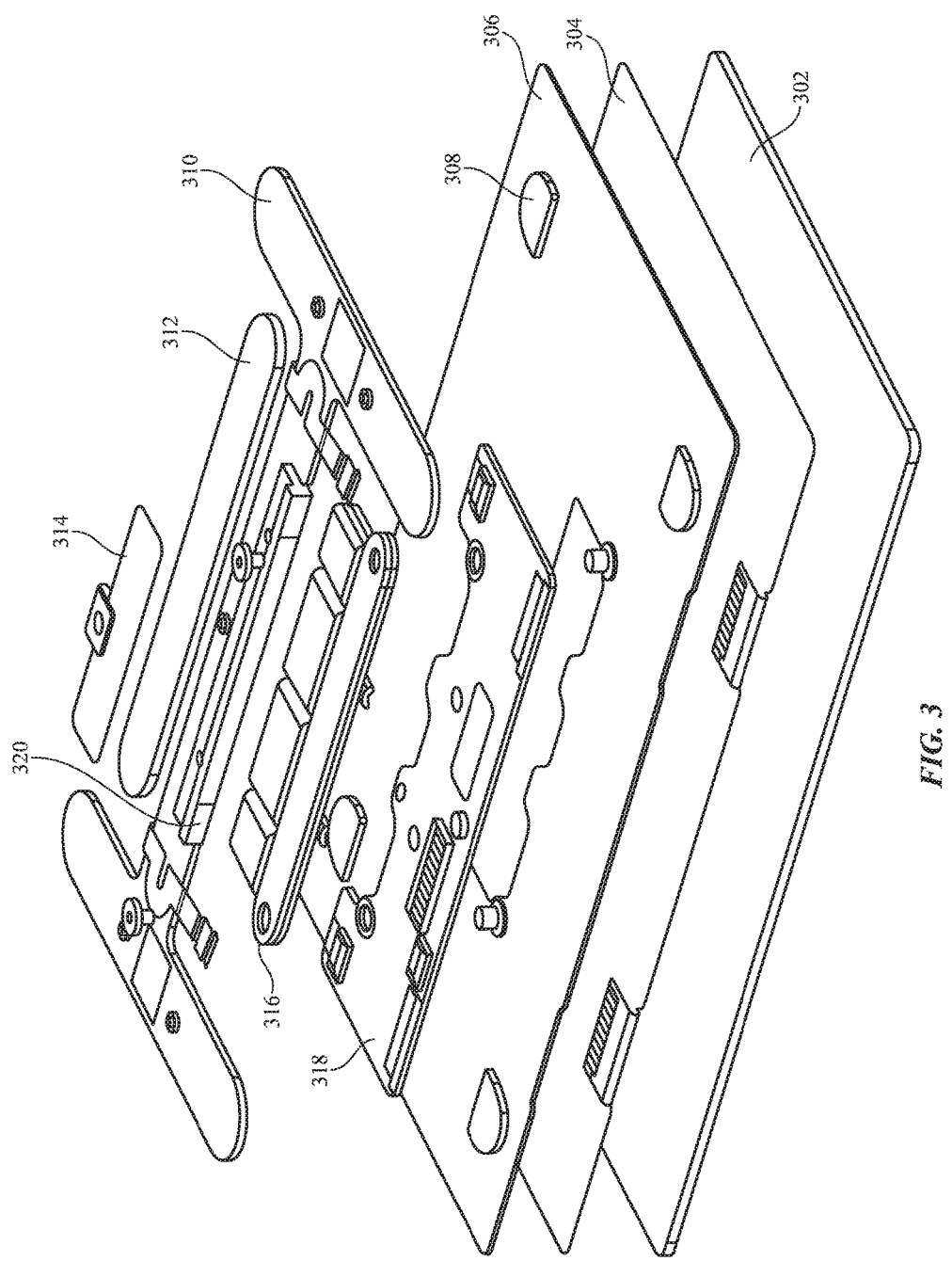
FIG. 3 is an exploded isometric view of the haptic device of according to one or more embodiments of the present disclosure.

FIG. 3 illustrates an exploded isometric view of an exemplary haptic device 300. In some embodiments, the haptic device 300 may be similar to the haptic device 102 described above. The haptic device 300 may include multiple layers including a glass layer 302 a touch sensor layer 304 and a ground layer 306 although fewer or additional layers are contemplated. As shown in FIG. 3, the ground layer 306 may include one or more gel pads 308. The gel pads 308 may be used to secure and support the haptic device 102 to the electronic device 100 and/or to support a feedback surface such as, for example the glass layer 302. In some embodiments, the haptic device 300 may include four gel pads 308 that each may be operably connected to the feedback surface below or at a location substantially adjacent to the location of the sensors 202 (FIG. 2). Although four gel pads 308 are specifically mentioned, any number of gel pads 308 may be used.

The gel pads 308 may also provide a biasing force to the various layers of the haptic device (e.g., the feedback surface 200 (FIG. 2), or the glass layer 302) to return them to a nominal or first position. The gel pads 308 may be substantially any member capable of providing a biasing or return force to the feedback surface. In some embodiments, the gel pads 308 may be a silicone based gel that may be positioned around the sides of the various layers or the feedback surface. In other embodiments, the gel pads 308 can be one or more springs poisoned on or between the various layers. In yet other embodiments, the haptic device 300 may use a magnetic force from one or more magnets to return the feedback surface to its nominal position.

The haptic device 300 may also include a force sensor assembly 310 configured to be coupled to the ground layer 306. The force sensor assembly 310 may include a stiffener 312, an electrostatic discharge component 314, an actuator 316, a circuit board 318 and an attraction plate 320. Although a single actuator 316 is shown, the haptic device 300 may include two or more actuators 316. In some embodiments, the actuator 316 may be configured to receive one or more haptic input signals from a processing device or other controlling element. As will be discussed below, the input signals may include both audio waveforms and current waveforms that may be converted into mechanical movement by the actuator 316.

Any suitable type of actuator 316 can be included in the haptic device 300. For example, an actuator 316 may be a solenoid actuator including a wire wound around a moveable iron core, and as a current passes through the wire coil, the iron core may move correspondingly. Specifically, the electric current through the wire may create a magnetic field. The magnetic field may then apply a force to the core or plunger, to either attract or repel the core. In these embodiments, the actuator 316 may also include a spring or biasing member which may return the core to its original position after the magnetic field is removed. In other embodiments, an actuator 316 may be an electromagnet, or a series of magnets that are selectively energized to attract or repel the feedback surface. As a specific example, the actuator 316 may be a series of bar electromagnets with alternating poles that may be used to mechanically move the feedback surface.

Each actuator 316 in the haptic device 300 may selectively move the feedback surface or one or more layers of the haptic device 300 in a horizontal and/or linear direction. In other words, the feedback surface may translate horizontally or laterally but may not move substantially vertically with respect to the enclosure 106. In other embodiments, the actuators 316 may move the feedback surface in a vertical direction (e.g., along a Z axis) or in a combination of vertical and linear directions. In some implementations the vertical movement may produce the audio output while the horizontal or lateral movement provides the haptic output.

For example, the motion of the feedback surface in one or more directions, such as, for example, the Z-direction, may move the air that surrounds the feedback surface and produce sound. Additionally or alternatively, movement in a horizontal direction may produce a haptic output.

Figure 4A:
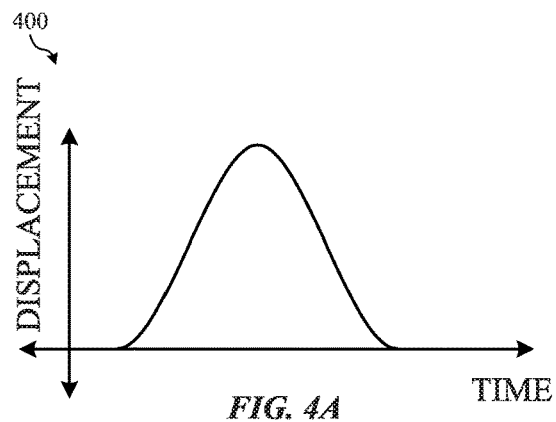
FIG. 4A-FIG. 4D illustrate exemplary input and output waveforms that may be used by and/or output from, a haptic device according to one or more embodiments of the present disclosure.
Figure 4B:
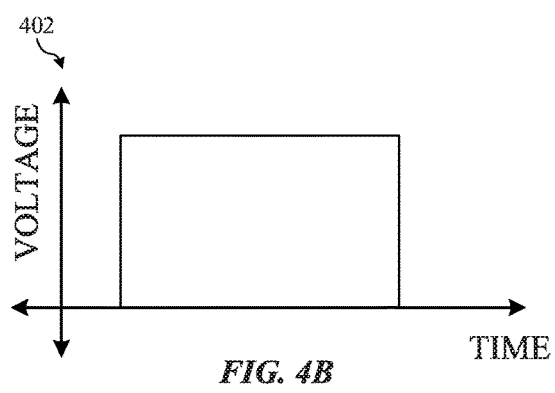

FIG. 4A - FIG. 4D illustrate exemplary waveforms that may be used by and/or produced by a haptic device, such as, for example, haptic device 102 (FIG. 1A-FIG. 10). More specifically, FIG. 4A illustrates a desired output waveform 400 that is configured to produce a desired haptic output. As shown in FIG. 4A, the desired output waveform 400 is a Gaussian wave although other output waveforms are contemplated.

As discussed above, embodiments of the present disclosure utilize a model that receives parameters or characteristics associated with the desired output waveform. In some embodiments, the characteristics may include a desired amplitude and a desired time. Although amplitude and time are specifically mentioned, other characteristics may be specified and used. These other characteristics include momentum, speed, frequency and so on.

Once the characteristics are received by the model, the model is able to determine the current that is needed to produce the desired output waveform 400. More specifically, and as will be described below, the model receives the desired characteristics and calculates the input waveform (represented as current vs. time) required to produce the desired haptic output. For example, the model may determine that based on the displacement versus time characteristics of the desired output waveform 400, the required input waveform is a square input waveform 402 shown in FIG. 4B. Although a square input waveform 402 is specifically mentioned and shown, the input waveform may have any shape. In some embodiments, the edges of the square input waveform 402 may be rounded.

Figure 4C:
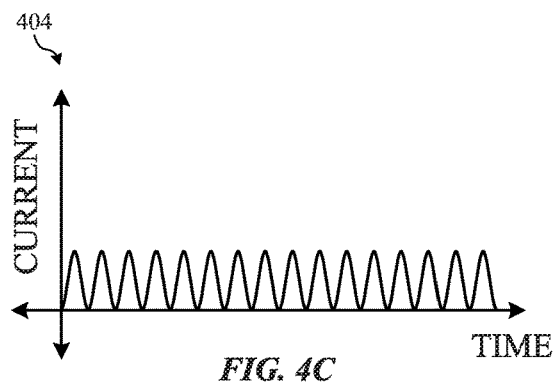

Once the input waveform 402 has been determined, the input waveform may be provided to a haptic device to produce the desired haptic output (e.g., an output that follows the shape of the desired output waveform 400). However, as discussed above, embodiments of the present disclosure utilize a haptic device to produce both haptic output and audio output. Accordingly, an audio waveform 404 such as shown in FIG. 4C may be superimposed on the input waveform 402.

Although the audio waveform 404 is represented as a sine wave, other waveforms are contemplated. Further, although a specific audio waveform is shown, the audio waveform may have various amplitudes, frequencies and durations. In addition, different types of audio waveforms may be superimposed on the input waveform 402. That is, different audio output may be provided with the same haptic output. Likewise, the same audio output may be provided with different haptic output.

Figure 4D:
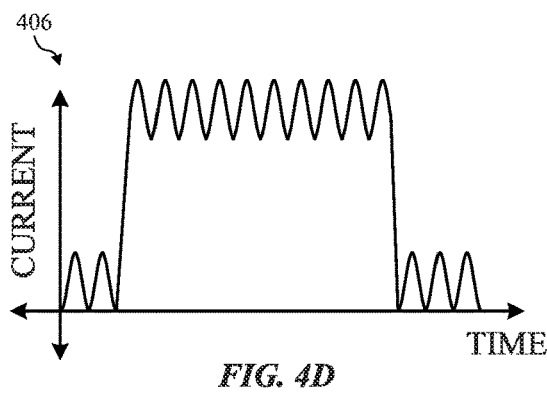

As discussed above, the audio waveform 404 is superimposed on the input waveform 420. An exemplary audio and haptic input waveform 406 is shown in FIG. 4D. Once the audio and haptic input waveform 406 has been created or generated, the audio and haptic input waveform 406 is provided to a haptic device.

As will be appreciated, the levels of the acoustic and haptic output provided by the haptic device may be adjusted and changed. For example, as one or both of the audio input signal and/or the haptic input signal of the audio and haptic input waveform 406 varies, the output provided by the haptic device will also vary.

In some embodiments, a first sound may be produced when a single actuator moves the feedback surface. In embodiments where multiple actuators are used, different haptic output and/or audio output may be provided by each actuator. Thus, the audio output and haptic output of a haptic device can be adjusted based on the positioning and selective activation of one or more actuators.

In other embodiments, various types of audio and haptic input waveforms may be concatenated or otherwise combined to produce a series of different audio and haptic output. For example, a first type of audio and haptic input waveform may be combined with a second type of audio and haptic waveform. In other embodiments, an audio waveform may be provided to the haptic device followed by a haptic waveform and/or an audio and haptic input waveform and vice versa. As such, a user of an electronic device, such as electronic device 100, may first hear the audio, feel the haptic output and subsequently hear audio output.

Figure 5:
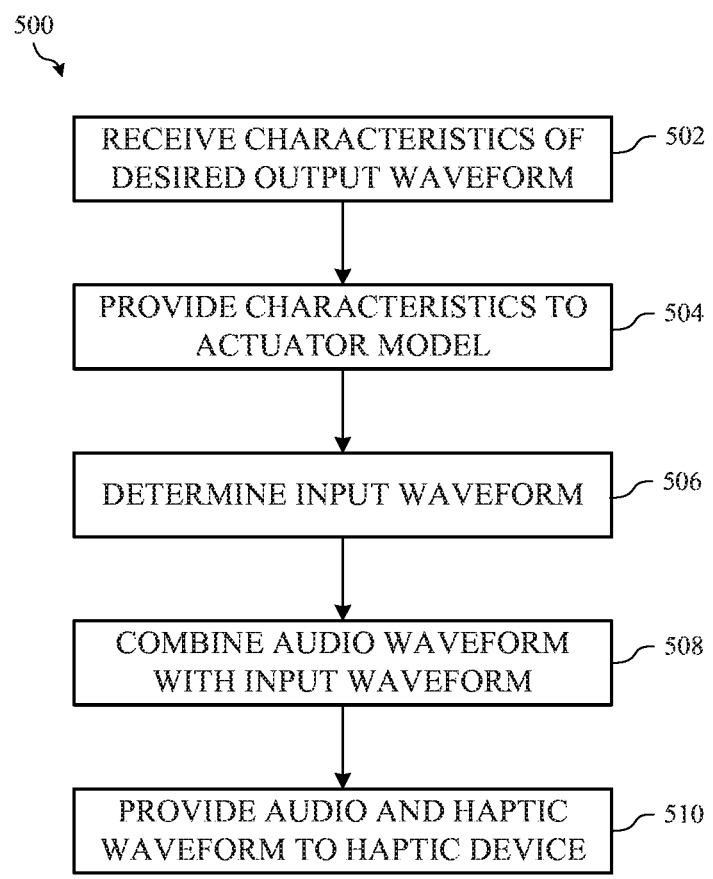
FIG. 5 illustrates a sample method for providing audio and haptic output using a haptic device according to one or more embodiments of the present disclosure.

FIG. 5 illustrates a method 500 for providing audio output and/or haptic output using a haptic output device. In some embodiments, the method 500 may be performed by the haptic device shown and described above. That is, a single haptic device may be configured to provide both haptic output and audio output simultaneously or substantially simultaneously. In other embodiments, the method 500 may be performed by multiple haptic devices. In such embodiments, each haptic device or haptic actuator of a single haptic device may be configured to produce a first type of haptic output (and optionally audio output) while a second haptic device or haptic actuator of the single haptic device may be configured to produce a second, different type of haptic and/or audio output.

Method 500 begins at operation 502 when characteristics of a desired output waveform are received. In some embodiments, these characteristics include a desired displacement of an element of the haptic device (e.g., an actuator mass, a plate of a trackpad and so on) as well as a time duration for the displacement. For example, the desired displacement may include a peak displacement based on the type of haptic output that is desired and a time frame in which the displacement is to occur. In other embodiments, the characteristics may include a momentum of an element of the haptic device, a velocity of the element of the haptic device and so on. In some implementations, each characteristic or combination of characteristics of the output waveform may be associated with a different type of haptic output. For example, a first displacement characteristic and a first time characteristic may produce a first type of haptic output while a second displacement characteristic and a second time characteristic may produce a second type of haptic output.

Once the characteristics of the desired output waveform have been obtained, flow proceeds to operation 504 and the characteristics are provided to an actuator model or transfer function such as described above. The actuator model is configured to analyze the characteristics of the desired output waveform and determine 506 an input waveform that will cause the haptic device (or various elements of the haptic device) to move in accordance with the desired output waveform. In some embodiments, and as will be described below, the actuator model is also configured to calibrate the haptic device and/or otherwise alter the input waveform based on various factors (e.g., gap, stiffness of the biasing supports, efficiency of the haptic device or of the actuators of the haptic device, and so on). As a result of the calibration, the haptic output (and the audio output when provided) may remain constant or substantially constant across various devices and over the life of the device. As discussed above, the haptic input waveform can be, for example, a sinusoidal wave, a half sinusoidal wave, a half elliptical wave, a saw-tooth wave, a pulse, a ramp down or ramp up wave, a square wave, and various combinations of such waveforms.

If audio is to be provided, flow proceeds to operation 508 and the determined and/or generated input waveform is combined with one or more audio waveforms. Like the desired output waveform, the audio waveforms may be selected from a library of waveforms and may be specific to a particular type of action being taken by a user. In some embodiments, the audio waveform is provided by a synthesizer engine. The synthesizer engine may be part of a processor or may be a separate module or component configured to generate and/or provide an input to a haptic actuator. For example, depending on the type of output that is to be provided by a haptic output device, the synthesizer engine may provide or generate various input waveforms to the haptic output device. This information may be generated by the synthesizer engine and provided to the haptic output device in real time. The synthesizer engine may also provide instructions to other modules which cause additional output to be provided. For example, the synthesizer engine may instruct, or otherwise cause a speaker or other audio component to provide audio output with a given haptic output.

Once the audio waveform and input waveform have been combined, flow proceeds to operation 510 and the combined audio and haptic waveform is provided to a haptic device. As the haptic device receives the input signal, movement of the various components of the haptic device causes the haptic output and the audio output. In some embodiments, the audio output is provided before the haptic output although this may vary. As discussed above, output by the haptic device may vary, such that one type of audio and haptic input waveform may have a different audio and haptic output compared to another waveform. In other words, the displacement and/or speed of movement of the actuator may be varied by changing the shape, frequency, amplitude, phase, and/or duration of the input signal. Thus, by changing the input signal the haptic and audio output experienced by a user may be varied.

As briefly discussed above, haptic devices generating output waveforms may be affected by the stiffness of a gel, gap between components of the haptic device actuator efficiency and the like. To account for these variables, a series of Gaussian pulses with known peak amplitude can be applied to the haptic device. The input waveforms can be compared to the output waveforms.

Based upon the difference in magnitude between the input Gaussian pulse and the measured output waveform, an approximation of the variables can be obtained by solving a second-order differential equation. Thereafter, the peak amplitude of the input Gaussian pulse can be changed, and a new solution to the variables can be determined. As this process is repeated, a functional relationship between peak amplitude of a Gaussian pulse and the variables, such as, for example, a gel stiffness can be determined. Thereafter, this function can be used (with or without amplitude scaling) to define a filter that effectively mitigates any distortions, attenuations, or other effects introduced by the haptic device when the input waveform is a Gaussian pulse or other such waveform. This function (and/or coefficients that define this functional relationship) can be saved as calibration parameters to be used to filter arbitrary input waveforms.

Figure 6:
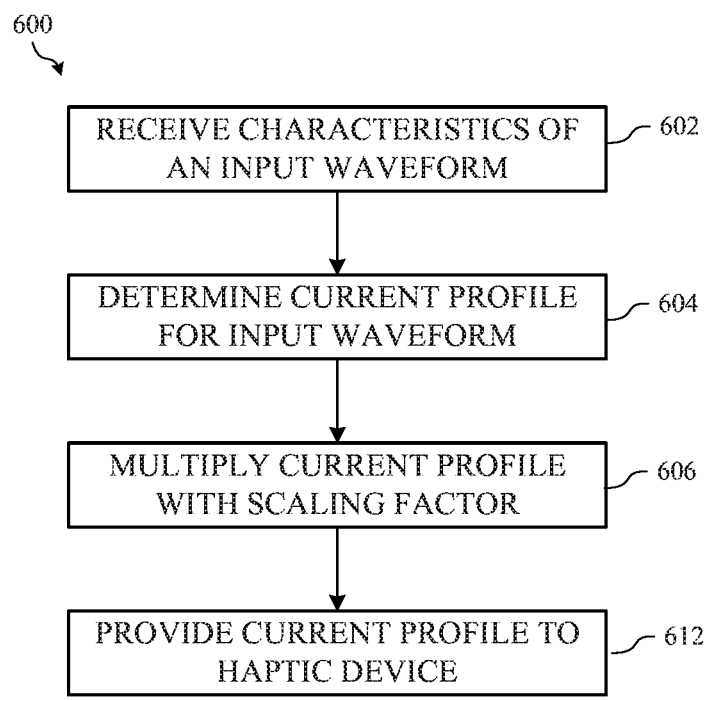
FIG. 6 illustrates a sample method for determining an input current that may be multiplied by a scaling factor to produce a desired output waveform according to one or more embodiments of the present disclosure.

FIG. 6 illustrates a sample method 600 for determining an input current that may be multiplied by a scaling factor to produce a desired output waveform according to one or more embodiments of the present disclosure. The desired output waveform may be associated with haptic output, audio output, and/or a combination of haptic output and audio output. In some embodiments, the method 600 may be performed at various times including, but not limited to, the time the haptic device is manufactured, the time the electronic device is manufactured, or at various times as specified by the user or in response to various external events. Additionally, the method 600 may be used to calibrate the haptic device based on different manufacturing tolerances of the components of the electronic device and/or other variations of components that are used in the haptic device. More specifically, the calibration technique described may be used to account for the stiffness of one or more gel pads or other biasing members of the haptic device, gap that is present between an actuator and an actuator plate, efficiency of the actuator and other such variables such as explained above.

Method 600 begins at operation 602 when characteristics of an input waveform are received or otherwise defined. In some embodiments, the characteristics of the input waveform that are used as input to the transfer function may include a desired peak amplitude of the input waveform. Although the term peak amplitude is used, a haptic actuator of the present disclosure may have many desired peak amplitudes associated with an input waveform. For example, a first type of output that is to be provided by the haptic actuator may be associated with an input waveform having a first peak amplitude while a second type of output that is to be provided by the haptic actuator may be associated with an input waveform having a second peak amplitude. In addition to peak amplitude, the input waveform may be specified by other desired characteristics. These characteristics include but are not limited to a desired duration, frequency, velocity, displacement, momentum and so on.

In some embodiments, the input waveform may be represented as a Gaussian waveform although other waveforms may be used. For example, the input waveform and/or the output waveform may be represented as a sine wave, a sawtooth wave, a square wave, arbitrary waves and the like.

The input waveform may also correspond to a desired output waveform. More specifically, given a desired output waveform, an input waveform may be generated that results in an actual output motion of the haptic actuator, or a component of the haptic actuator (e.g., a plate of the haptic trackpad) that matches the desired output waveform. However, and as discussed above, it may be desirable to provide a user with the same or substantially similar haptic output and/or audio output that is the same or substantially similar across various devices and/or throughout the life of the device. Accordingly, the input waveform may need to be modified and/or the haptic device may need to be calibrated to account for various manufacturing tolerances such as gel stiffness such as described above.

Once the characteristics of the input waveform have been obtained, flow proceeds to operation 604 and a current profile associated with the input waveform is determined. As briefly discussed above, the current profile is used to determine a current or voltage that is provided to the haptic actuator. The applied current or voltage may then cause a component of the haptic trackpad (e.g., a plate of the trackpad) and/or a component of the haptic actuator (e.g., a mass of the haptic actuator) to have an actual output motion (or provide an output waveform) that matches the desired output waveform.

In some embodiments, the current profile may be determined using a relationship between a gap 'G' present in the haptic device at a given time 't', represented as G(t), and an amount of force 'F' provided by the haptic actuator at the given time t represented herein as F(t). More specifically, the current profile may be determined using a lookup table between the gap and the output force provided by the haptic actuator and the current profile. For example, the lookup table may be used to determine a current or an amount of voltage that should be provided to the haptic actuator to produce a given force when a gap of a certain distance is present in the haptic trackpad.

In some embodiments, the current profile may be determined using linear interpolation between points of the gap G(t) and the force F(t). Thus, when a given force and gap are known or desired, the table may be used to determine an amount of current that is to be applied to the haptic actuator.

In some embodiments, the gap is defined as the distance between the plate of the haptic trackpad and the haptic actuator. More specifically, the gap G(t) may be defined as a nominal gap (which may be unknown or may be known or fixed based on manufacturing tolerances and/or based on the actual known distance between the plate and haptic actuator of an assembled haptic trackpad) minus the displacement profile of the input waveform (which is also known as the input waveform was specified in operation 602 above).

In addition to finding the gap, the force that is output by the haptic actuator may also be needed to determine the current profile. In some embodiments, force, represented as F(t), is modeled using the following differential equation:

$$F(t) = M\ddot{x} + C\dot{x} + Kx$$

where M is the mass of the moving mass and its acceleration at time t, C is the damping coefficient of the haptic device (defined as $C = 2\zeta\sqrt{MK}$ with $\zeta$ being the damping ratio) and represents the change in velocity caused by the damping coefficient, and K is the stiffness of the biasing structures (e.g., the stiffness of the gel pads within the haptic device). More specifically the above differential equation may be used as a model to predict the output force of the haptic actuator based on the input waveform received in operation 602.

In certain implementations, some of the variables of the force model described above may be known. For example, the weight of the moving mass may be known during the manufacturing process. Likewise, the damping coefficient may also be known. Accordingly, the only unknown variable in the above model may be the stiffness K of the biasing structures (e.g., the gel pads) of the haptic trackpad.

In some embodiments, the K value may depend on or otherwise be associated with the peak displacement of a given input waveform. More specifically, the peak displacement p of an input waveform may have a quadratic relationship with the stiffness K and may be represented by the quadratic model:

$$K(p) = K_a p^2 + K_b p + K_c$$

where $K_a$, $K_b$ and $K_c$ are coefficients that define a vector or other such value that is dependent on a peak amplitude of the input waveform and that minimizes ring out (e.g., movement of the actuator mass after current is no longer applied or provided to the haptic actuator) of the haptic trackpad. However, as the stiffness K is unknown, the values for the above quadratic model may be found experimentally.

Figure 7:
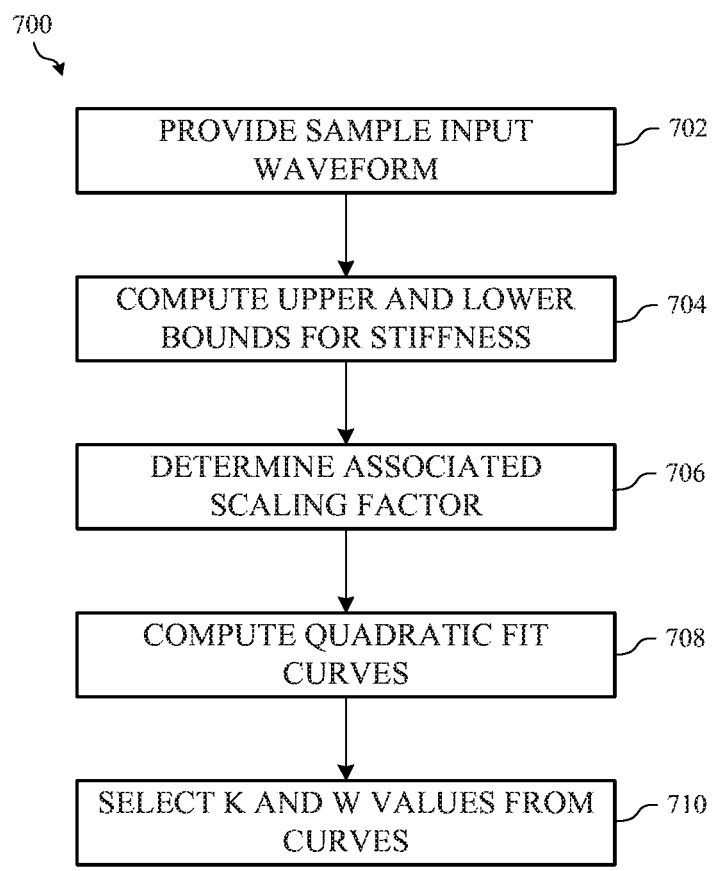
FIG. 7 illustrates a sample method for using a model to calibrate a haptic device according to one or more embodiments of the present disclosure.

As such, FIG. 7 illustrates a method 700 for determining a spring constant or stiffness value K as well as the scaling factor that is used to determine the current profile such as described above. As briefly discussed, the stiffness value K is quadratically related to the peak amplitude p of the input waveform. In addition, the scaling factor, represented herein as w, also varies quadratically with respect to peak amplitude and may be represented by the quadratic model:

$$w(p) = w_a p^2 + w_b p + w_c$$

where $w_a$, $w_b$ and $w_c$ are coefficients that define a vector or other such value that is dependent on a peak amplitude p of the input waveform and that minimize peak displacement errors of the haptic trackpad.

As discussed above, each input waveform is quadratically related to the stiffness K and a scaling factor w. As such, each input waveform will have coefficients in the above referenced quadratic models that may be used to calibrate the system. More specifically, the values of K and w may be determined experimentally. As such, operation 702 provides that a sample input waveform is selected. Values for K and w are then determined such that an output waveform matches the sample input waveform. In some embodiments, the sample input waveform may be an arbitrarily selected input waveform having a desired peak amplitude. The peak amplitude of this input waveform may then be used to determine a relationship between the stiffness K and the scaling factor w.

Figure 8:
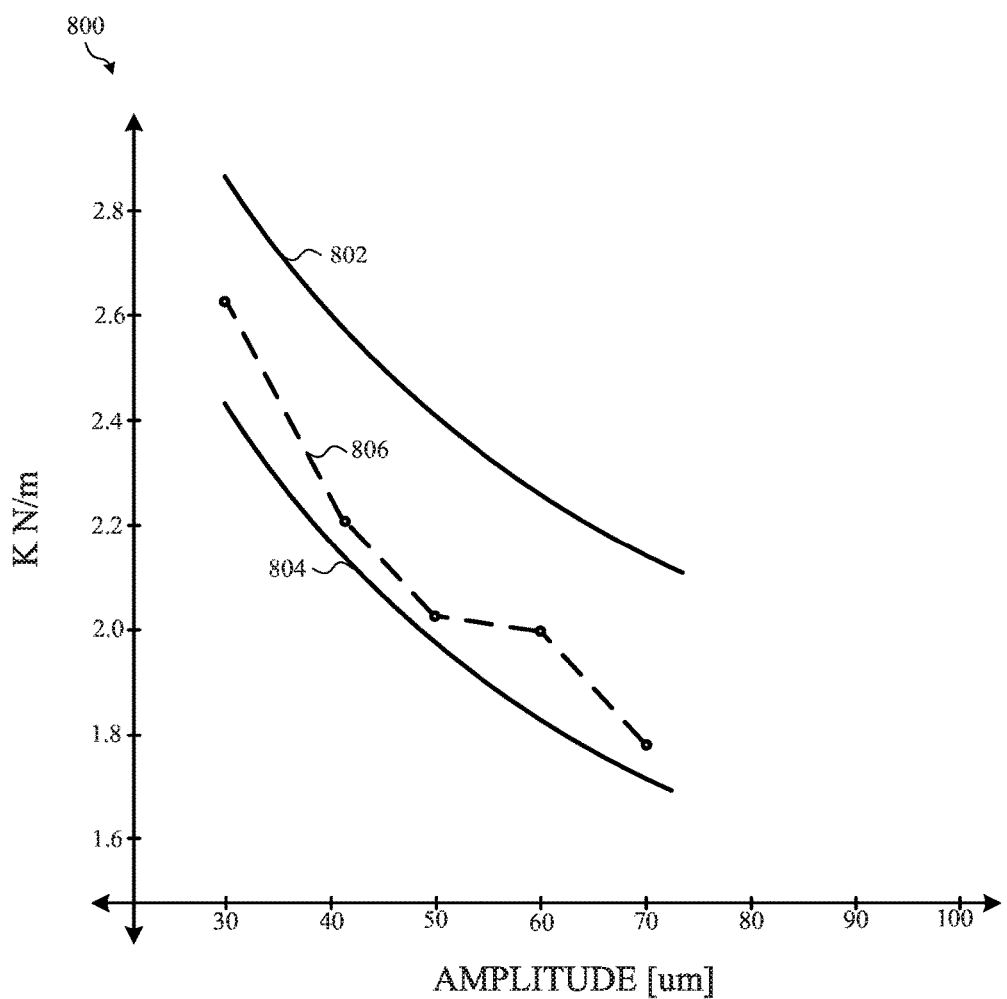
FIG. 8 is a graph that illustrates upper and lower bounds of a stiffness variable of biasing supports of a haptic device according to one or more embodiments of the present disclosure.

For example, and with reference to FIG. 8, multiple sample input waveforms may be selected to determine a relationship between the stiffness K and the scaling factor w. As shown in FIG. 8, input waveforms having desired amplitudes of 30 um, 40 um, 50 um, 60 um and 70 um are selected. Although these values are specifically mentioned, it is contemplated that any amplitude values may be used.

For each desired peak amplitude, operation 704 of method 700 provides that upper and lower bounds are defined. In some embodiments, the upper and lower bounds are defined in order to limit the search area and/or also minimizes the error between the peak amplitude and the desired peak amplitude. In some embodiments, the search bounds are defined by the curves:

$$K^{center}(p) = K_a^{center} p^2 + K_b^{center} p + K_c^{center}$$

$K^{UpperBound}(p) = K^{center} + K\text{search\_range}/2$ (shown by line 802)

$K^{LowerBound}(p) = K^{center} - K\text{search\_range}/2$ (shown by line 804)

More specifically, when a desired peak amplitude is provided to the model, a grid based search (bound by the lines 802 and 804) may be performed to find the optimal stiffness value K (shown as points along the line 806) for each received input waveform and their associated peak amplitudes. Further, the search is used to determine a scaling factor w that minimizes the error between the output peak amplitude and a desired peak amplitude.

More specifically, operation 706 provides that the a scaling factor w is determined such that, when the current profile is multiplied by the scaling factor w, the scaling factor increases (or decreases) an amount of current applied to the system which causes the output waveform to match or substantially match the input waveform while accounting for the stiffness K that is present in the haptic trackpad due to the biasing supports.

More specifically, to find the scaling factor w for each desired peak amplitude (e.g., 30 um, 40 um, 50 um, 60 um and 70 um) a search for w is performed using the following algorithm:

Get output peak displacement $p(w)$

If $(|p(w)-p_{goal}|<p_{max\ error})$

Break $w=w*(p(w)/p_{goal})^{1/3}$

Figure 9A:
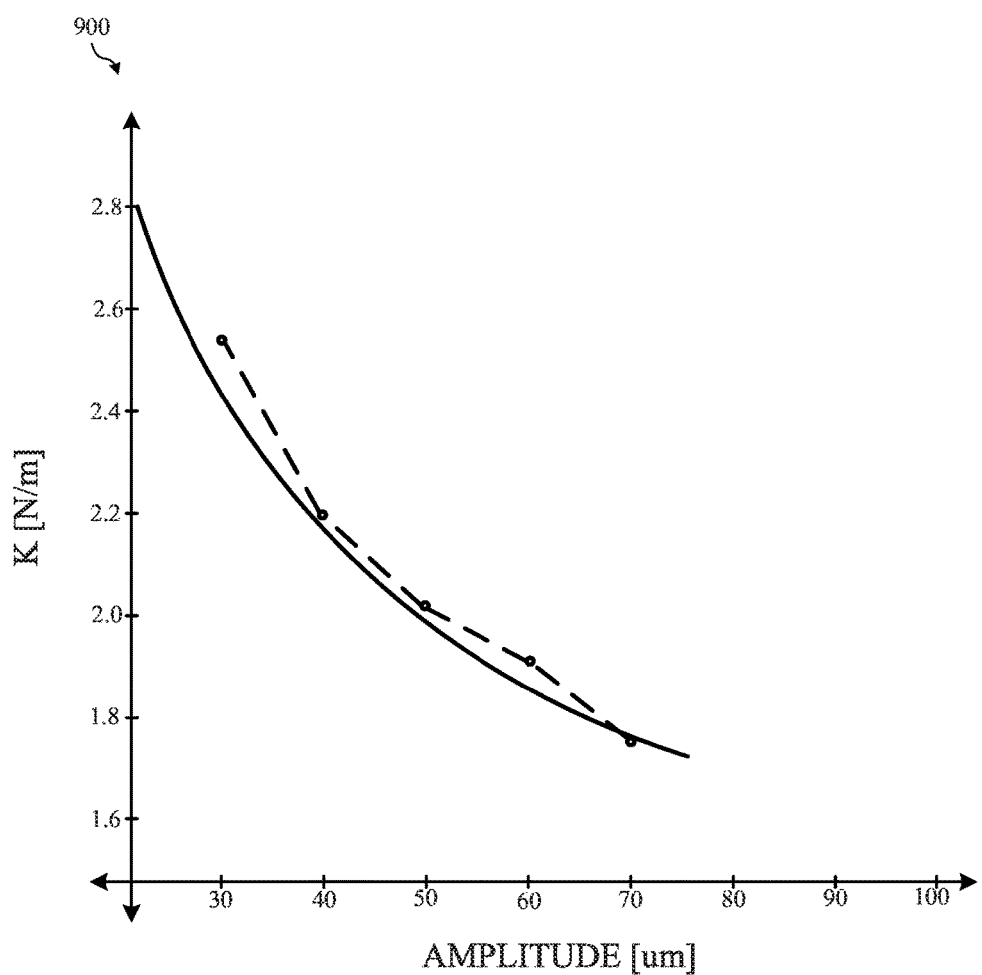
FIG. 9A-FIG. 9B illustrate quadratic curve fit graphs for a spring constant and amplitude factor according to one or more embodiments of the present disclosure.
Figure 9B:
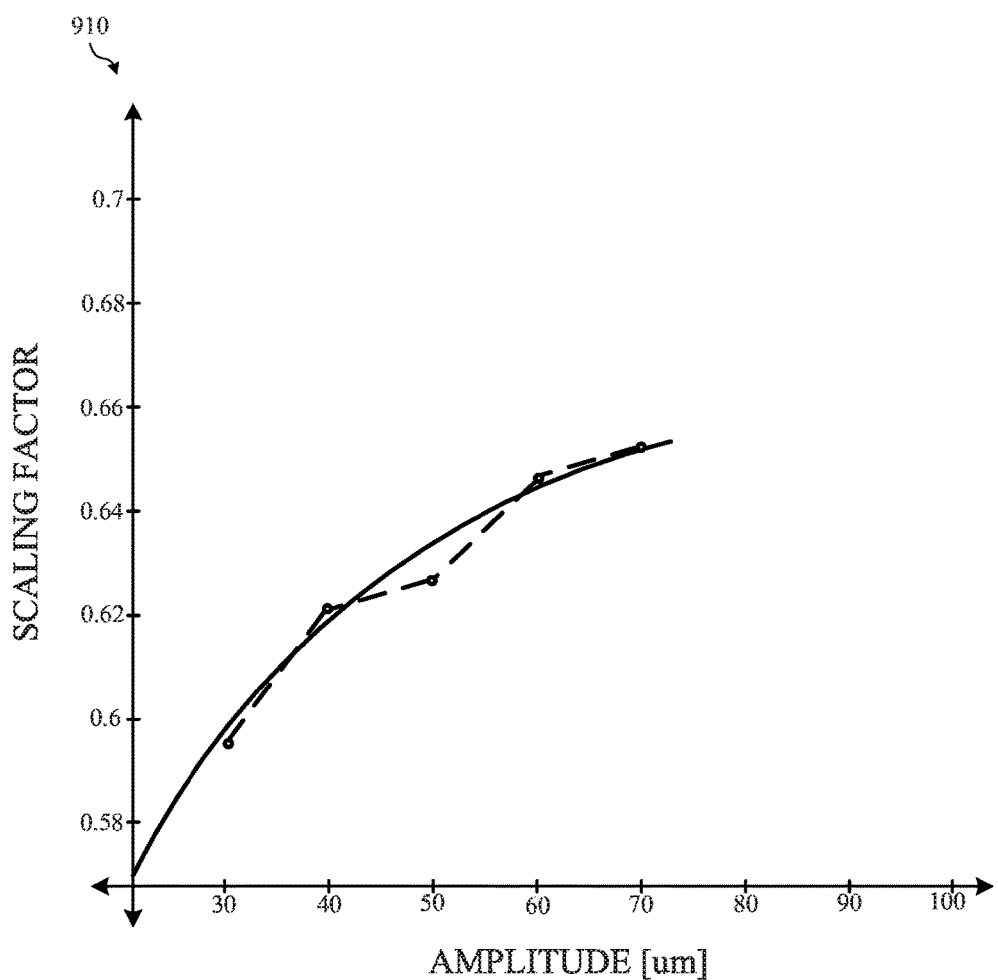

Using the above algorithm, a scaling factor for each desired peak amplitude may be determined and plotted on a graph (such as shown in FIG. 9B). Once the values for K and w have been determined, flow proceeds to operation 708 and quadratic curve fits are performed on the set of points (p, K(p)) and (p, w(p)) to compute calibration curves for each K and w value at the different amplitudes.

More specifically, values for K and w for each received peak displacement value may be plotted on graphs 900 and 910 of FIGS. 9A and 9B respectively. A quadratic fit is then performed between the values on each graph to determine values for K and w that are used in the above referenced quadratic models.

Once these values are determined, flow proceeds to operation 710 and values of K and w are selected depending on, for example, the desired amplitude. For example, if a desired output waveform has an amplitude of 50 um, graph 900 illustrates that a spring constant K of approximately two nanometers should be selected. Likewise, for the amplitude of 50 um, a scaling factor of approximately 6.3 should be selected such as shown on graph 910 of FIG. 9A.

Returning to method 600 of FIG. 6, Once the scaling factor w and the values for K have been determined, operation 606 of method 600 provides that the determined scaling factor is then applied to the input waveform. More specifically and as discussed above, the scaling factor is a value that, when multiplied with the current profile, causes the output waveform (e.g., the movement of the plate of the haptic trackpad) to match or substantially match the shape of the input waveform (while accounting for the stiffness of one or more biasing structures). Operation 612 then provides that the modified current profile may then subsequently be provided to the haptic device.

The illustrative methods shown in FIG. 6-FIG. 7 may be performed by a manufacturer at the time the haptic device is fabricated. Additionally or alternatively, the method can be performed by a user when a user wishes to change the haptic and acoustic output of a haptic device or may be performed at any time a user wants to recalibrate the haptic device. For example, the electronic device may include an accelerometer that is configured to detect a fall event. In response to the fall event, the electronic device may determine that a recalibration is warranted.

Other embodiments can perform the methods shown in FIG. 6-FIG. 7 differently. Additionally, each method can be used for a single actuator or for multiple actuators in a haptic device. In embodiments that have multiple actuators, a different input signal can be input into each actuator, or all of the actuators can receive the same input signal.

Figure 10:
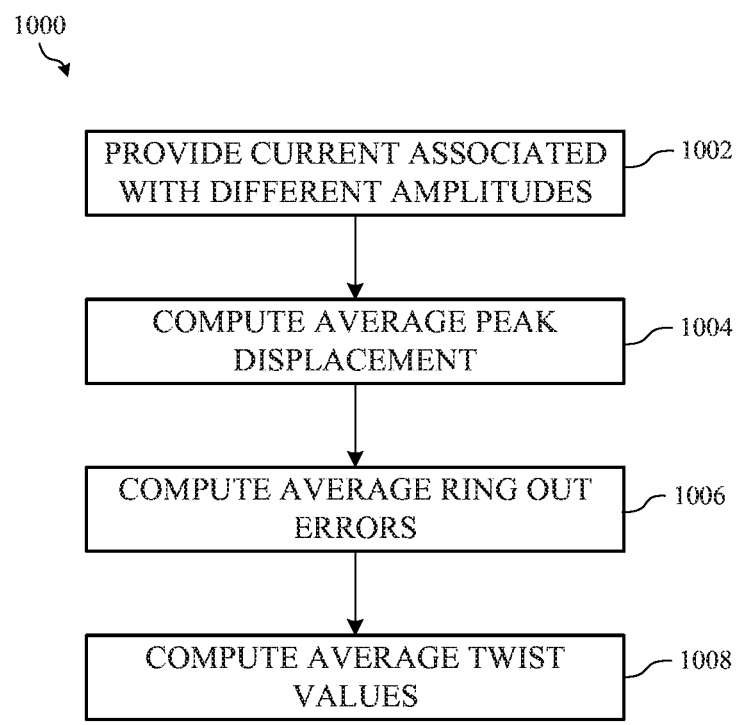
FIG. 10 illustrates a method for verifying calibration parameters according to one or more embodiments of the present disclosure.

When the calibration parameters K and w have been determined, these parameters may also be checked or otherwise verified. Accordingly, FIG. 10 illustrates a method 1000 for checking the calibration parameters according to one or more embodiments of the present disclosure.

Method 1000 begins at operation 1002 in which an input waveform is provided to the haptic device and/or the model to cause the haptic device to reach predetermined amplitudes over a predetermined time or number of inputs. For example, in one embodiment, the input waveform is applied to the haptic device 10 times to provide target amplitudes or displacements of 30 microns, 50 microns and 70 microns. In some embodiments, the input waveform causes the haptic output to occur for a predetermined or set amount of time. Although specific amplitudes and time durations are specified, other goal amplitudes and time durations may be used.

Flow then proceeds to operation 1004 and the average peak displacement for each goal amplitude is determined. Flow then proceeds to operation 1006 and the average ring out errors for each goal amplitude is determined. The average twist values for each goal amplitude is also determined 1008. Using these values, it may be determined whether the average ring out error and/or the average peak displacement error fall within predetermined thresholds. If so, the calibration is successful. If not, the calibration process described in FIG. 6-FIG. 7 may be repeated.

Figure 11:
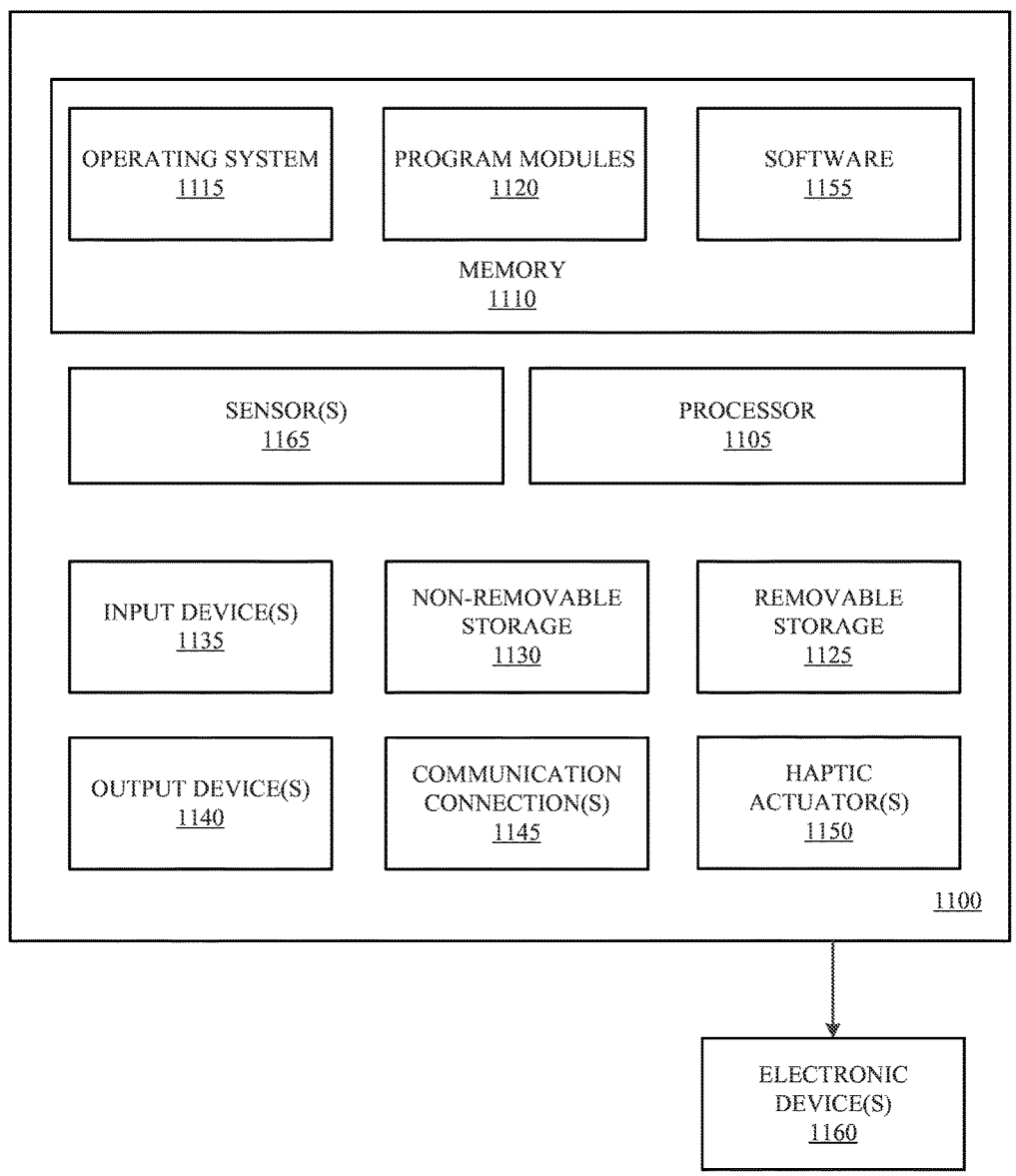
FIG. 11 is a block diagram illustrating exemplary components of a computing device according to one or more embodiments of the present disclosure.

FIG. 11 is a block diagram illustrating exemplary components, such as, for example, hardware components, of an electronic device 1100 according to one or more embodiments of the present disclosure. In certain embodiments, the electronic device 1100 may be similar to the various electronic devices 100 described above. Although various components of the electronic device 1100 are shown, connections and communication channels between each of the components are omitted for simplicity.

In a basic configuration, the electronic device 1100 may include at least one processor 1105 and an associated memory 1110. The processor 1105 may be used to determine the various calibration parameters described above. The memory 1110 may comprise, but is not limited to, volatile storage such as random access memory, non-volatile storage such as read-only memory, flash memory, or any combination thereof. The memory 1110 may store an operating system 1115 and one or more program modules 1120 suitable for running software applications 1155. The operating system 1115 may be configured to control the electronic device 1100 and/or one or more software applications 1155 being executed by the operating system 1115. The software applications 1155 may include browser applications, e-mail applications, calendaring applications, contact manager applications, messaging applications, games, media player applications, time keeping applications and the like some or all of which may provide both haptic output and audio output. More specifically, the software applications 1155 may include instructions that cause a haptic device to output various combinations of haptic output and tactile output.

The electronic device 1100 may have additional features or functionality than those expressly described herein. For example, the electronic device 1100 may also include additional data storage devices, removable and non-removable, such as, for example, magnetic disks, optical disks, or tape. Exemplary storage devices are illustrated in FIG. 11 by removable storage device 1125 and a non-removable storage device 1130. In certain embodiments, various program modules and data files may be stored in the system memory 1110.

As also shown in FIG. 11, the electronic device 1100 may include one or more input devices 1135. The input devices 1135 may include a trackpad, a keyboard, a mouse, a pen or stylus, a sound input device, a touch input device, and the like. The electronic device 1100 may also include one or more output devices 1140. The output devices 1140 may include a display, one or more speakers, a printer, and the like. The electronic device 1100 may also include one or more haptic actuators 1150 that are configured to provide both tactile and audio output. As discussed above, the haptic actuators 1150 may be part of the input devices 1135 and/or the output devices 1140.

The electronic device 1100 may also include one or more sensors 1165. The sensors may include, but are not limited to, accelerometers, ambient light sensors, photodiodes, gyroscopes, magnetometers and so on. These sensors 1165 may work in conjunction with the processor 1105 to determine when and/or what type of haptic and/or audio output should be provided. The sensors 1165 may also be able to determine when the electronic device 1100 should be recalibrated.

The electronic device 1100 also includes communication connections 1145 that facilitate communications with additional electronic devices 1160. Such communication connections 1145 may include a RF transmitter, a receiver, and/or transceiver circuitry, universal serial bus (USB) communications, parallel ports and/or serial ports.

As used herein, the term computer-readable media may include computer storage media. Computer storage media may include volatile and nonvolatile media and/or removable and non-removable media implemented in any method or technology for the storage of information. Examples include computer-readable instructions, data structures, or program modules. The memory 1110, the removable storage device 1125, and the non-removable storage device 1130 are all examples of computer storage media. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 1100. Any such computer storage media may be part of the electronic device 1100. Computer storage media may store instructions which, when executed by the processor 1105, dynamically adjust a current applied to a light source.

In certain embodiments, the electronic device 1100 includes a power supply such as a battery, a solar cell, and the like that provides power to each of the components shown. The power supply may also include an external power source, such as an AC adapter or other such connector that supplements or recharges the batteries. The electronic device 1100 may also include a radio that performs the function of transmitting and receiving radio frequency communications. Additionally, communications received by the radio may be disseminated to the application programs. Likewise, communications from the application programs may be disseminated to the radio as needed.

The electronic device 1100 may also include a visual indicator, a keypad and a display. In embodiments, the keypad may be a physical keypad or a virtual keypad generated on a touch screen display. The visual indicator may be used to provide visual notifications to a user of the electronic device. The electronic device 1100 may also include an audio interface for producing audible notifications and alerts.

In certain embodiments, the visual indicator is a light emitting diode (LED) or other such light source and the audio interface is a speaker. In other embodiments, the audio interface may be configured to receive audio input.

The audio interface may also be used to provide and receive audible signals from a user of the electronic device 1100. For example, a microphone may be used to receive audible input. In accordance with embodiments of the present disclosure, the microphone may also serve as an audio sensor to facilitate control of notifications such as described above. The system may further include a video interface that enables an operation of an on-board camera to record still images, video, and the like.

Embodiments of the present disclosure are described above with reference to block diagrams and operational illustrations of methods and the like. The operations described may occur out of the order as shown in any of the figures. Additionally, one or more operations may be removed or executed substantially concurrently. For example, two blocks shown in succession may be executed substantially concurrently. Additionally, the blocks may be executed in the reverse order.

In addition, it will be understood that variations and modifications can be effected within the spirit and scope of the disclosure. And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

What is claimed is:

1. A method of calibrating a haptic device, the method comprising:
   receiving at a controller of the haptic device one or more respective characteristics of each of a plurality of input waveforms, wherein distortions in the haptic device cause the haptic device to generate a haptic output different from a desired haptic output;
   determining respective current profiles associated with each of the plurality of input waveforms having the respective characteristics;
   applying, by the controller, the current profiles to a haptic actuator of the haptic device to produce respective output waveforms;
   measuring respective characteristics of the respective output waveforms;
   determining a scaling factor and a stiffness associated with one or more biasing supports of the haptic actuator based on the measured respective characteristics of the respective output waveforms; and
   calibrating the haptic device based on the determined scaling factor and stiffness to account for the distortions.

2. The method of claim 1, wherein the scaling factor accounts for one or more of:
   a structure of the haptic device; and
   a gap between a first component of the haptic device and the haptic actuator of the haptic device.

3. The method of claim 1, wherein determining the current profiles associated with the input waveforms comprises determining an amount of force output by the haptic device, wherein the amount of force is modeled as a differential equation.

4. The method of claim 1, wherein the scaling factor is quadratically related to peak amplitudes of the input waveforms.

5. The method of claim 4, wherein determining the scaling factor further comprises determining a quadratic relationship of the stiffness of the one or more biasing supports and the peak amplitudes.

6. The method of claim 5, wherein determining the quadratic relationship of the stiffness of the one or more biasing supports and the peak amplitudes comprises obtaining a quadratic fit of peak amplitudes to stiffness values for the plurality of input waveforms.

7. The method of claim 1, wherein the one or more respective characteristics of the input waveforms include one or more of a peak amplitude, a duration, a frequency, a velocity, a displacement, and a momentum.

8. A haptic output device comprising:
a feedback surface;
an actuator linked with the feedback surface;
one or more biasing supports linked with the feedback surface; and
a controller operatively coupled to the actuator, wherein the controller is configured to:
receive parameters of a desired haptic output to be produced by the actuator on the feedback surface;
determine, using at least the received parameters, an input waveform associated with the desired haptic output;
determine a current profile associated with the input waveform, wherein the current profile includes a scaling factor associated with a stiffness of the one or more biasing supports;
provide the current profile to the haptic output device to generate an actual output waveform on the feedback surface;
measure differences between the actual output waveform and the desired haptic output; and
calibrate the actuator using at least the measured differences.

9. The haptic output device of claim 8, wherein the one or more biasing supports include a gel pad.

10. The haptic output device of claim 8, wherein the one or more characteristics of the input waveform includes one or more of a desired amplitude and a desired duration.

11. The haptic output device of claim 8, wherein the controller is further configured to superimpose an audio waveform on top of the input waveform.

12. The haptic output device of claim 8, wherein the feedback surface is a touch surface of the haptic output device.

13. The haptic output device of claim 8, wherein the scaling factor is quadratically related to a peak amplitude of the input waveform.

14. The haptic output device of claim 8, wherein the calibration of the actuator comprises determining a quadratic relationship between the stiffness of the one or more biasing supports and peak amplitudes of a plurality of sample input waveforms.

15. A method of providing a tactile output and an audio output on a haptic device for an electronic device, the method comprising:
receiving, by a controller of the electronic device, characteristics of a desired output waveform to be provided by the haptic device;
generating an input waveform based on the desired output waveform by providing the characteristics to an actuator model having calibration parameters based on a scaling factor and a stiffness of one or more biasing supports of the haptic device;
adding an audio waveform on the input waveform;
providing the input waveform having the audio waveform to the haptic device to generate the tactile output and the audio output that corresponds to the audio waveform.

16. The method of claim 15, wherein the audio output is provided before the tactile output.

17. The method of claim 15, wherein the haptic device is a touch sensitive device.

18. The method of claim 15, further comprising calibrating the actuator by adjusting the calibration parameters.

19. The method of claim 18, wherein calibrating of the actuator comprises determining a quadratic relationship between the stiffness of the one or more biasing supports and peak amplitudes of a plurality of sample input waveforms.

* * * * *